United States Patent
Holland et al.

(10) Patent No.: US 10,197,704 B2
(45) Date of Patent: Feb. 5, 2019

(54) CORRECTIVE SCALING OF INTERPRETED FRACTURES BASED ON THE MICROSEISMIC DETECTION RANGE BIAS CORRECTION

(71) Applicants: Marc Holland, The Hague (NL); Xiaomei Zhang, Utrecht (NL)

(72) Inventors: Marc Holland, The Hague (NL); Xiaomei Zhang, Utrecht (NL)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 708 days.

(21) Appl. No.: 14/577,751

(22) Filed: Dec. 19, 2014

(65) Prior Publication Data
US 2016/0178798 A1    Jun. 23, 2016

(51) Int. Cl.
*E21B 47/00* (2012.01)
*G01V 99/00* (2009.01)
(Continued)

(52) U.S. Cl.
CPC .......... *G01V 99/005* (2013.01); *E21B 43/26* (2013.01); *E21B 47/00* (2013.01); *G01V 1/288* (2013.01);
(Continued)

(58) Field of Classification Search
None
See application file for complete search history.

(56) References Cited

U.S. PATENT DOCUMENTS

| | | | | |
|---|---|---|---|---|
| 4,679,174 A | * | 7/1987 | Gelfand | G01V 1/282 367/38 |
| 4,887,244 A | * | 12/1989 | Willis | G01V 1/28 367/40 |

(Continued)

FOREIGN PATENT DOCUMENTS

| | | |
|---|---|---|
| WO | 0140623 A1 | 6/2001 |
| WO | 2011077227 A2 | 6/2011 |

(Continued)

OTHER PUBLICATIONS

Notification of Transmittal of the International Search Report and the Written Opinion of the International Searching Authority, or the Declaration; PCT/US2015/061203; dated Jan. 28, 2016, 7 pages.
(Continued)

*Primary Examiner* — Kibrom K Gebresilassie
(74) *Attorney, Agent, or Firm* — Cantor Colburn LLP

(57) ABSTRACT

A method for correcting a fracture model of a reservoir includes receiving a seismic signal from seismic events due to a plurality of stimulated reservoir stages to provide detected seismic event information and estimating a number of undetected seismic events and a magnitude for each of the undetected seismic events to provide undetected seismic event information for each stage. The detected seismic event information and the undetected seismic event information provide corrected seismic event information for each stage. The method further includes calculating a scaling factor for each stage using a scalar property of the corresponding stage and a reference stage scalar property, applying the scaling factor for each stage to the corrected seismic event information to provide scaled seismic event information for each stage, and correcting the fracture model with the scaled seismic event information for each stage to provide a corrected fracture model.

18 Claims, 15 Drawing Sheets

(51) Int. Cl.
*E21B 43/26* (2006.01)
*G01V 1/48* (2006.01)
*G06F 17/10* (2006.01)
*G01V 1/28* (2006.01)
*G01V 1/30* (2006.01)
*G01V 1/38* (2006.01)
*G01V 1/42* (2006.01)
*G01V 1/50* (2006.01)

(52) U.S. Cl.
CPC ............. *G01V 1/301* (2013.01); *G01V 1/48* (2013.01); *G06F 17/10* (2013.01); *G01V 1/282* (2013.01); *G01V 1/3808* (2013.01); *G01V 1/42* (2013.01); *G01V 1/50* (2013.01); *G01V 2210/1234* (2013.01); *G01V 2210/1429* (2013.01); *G01V 2210/163* (2013.01); *G01V 2210/169* (2013.01); *G01V 2210/646* (2013.01); *G01V 2210/663* (2013.01)

(56) References Cited

U.S. PATENT DOCUMENTS

| | | | |
|---|---|---|---|
| 6,151,555 | A | 11/2000 | Van Bemmel et al. |
| 6,246,637 | B1* | 6/2001 | Gidlow .................. G01V 1/364 181/110 |
| 9,612,359 | B2* | 4/2017 | Holland ................. G01V 11/00 |
| 9,880,304 | B2* | 1/2018 | McKenna .............. G01V 1/288 |
| 2004/0008580 | A1 | 1/2004 | Fisher et al. |
| 2005/0273266 | A1 | 12/2005 | Nickel |
| 2007/0183260 | A1 | 8/2007 | Lee et al. |
| 2008/0247269 | A1 | 10/2008 | Chen |
| 2008/0249906 | A1 | 10/2008 | Landris, Jr. et al. |
| 2009/0034367 | A1* | 2/2009 | Sherrill .................. G01V 1/247 367/47 |
| 2009/0125240 | A1 | 5/2009 | Den Boer et al. |
| 2009/0279386 | A1* | 11/2009 | Monk .................. G01V 1/3808 367/21 |
| 2010/0018719 | A1* | 1/2010 | Lu .......................... G01V 3/12 166/369 |
| 2010/0256964 | A1 | 10/2010 | Lee et al. |
| 2010/0274492 | A1* | 10/2010 | Rentsch ............... G01V 1/3808 702/14 |
| 2010/0307755 | A1 | 12/2010 | Xu et al. |
| 2011/0029293 | A1 | 2/2011 | Petty et al. |
| 2011/0120702 | A1 | 5/2011 | Craig et al. |
| 2011/0125476 | A1 | 5/2011 | Craig |
| 2011/0305108 | A1* | 12/2011 | Goujon .................. G01V 1/364 367/24 |
| 2012/0092959 | A1* | 4/2012 | Taylor .................... G01V 1/288 367/32 |
| 2012/0160481 | A1 | 6/2012 | Williams |
| 2012/0290211 | A1 | 11/2012 | Murphy et al. |
| 2012/0318500 | A1 | 12/2012 | Urbancic et al. |
| 2013/0062054 | A1* | 3/2013 | Jo ........................... E21B 43/26 166/250.1 |
| 2013/0081805 | A1 | 4/2013 | Bradford et al. |
| 2013/0140020 | A1* | 6/2013 | Suarez-Rivera ........ E21B 43/26 166/250.1 |
| 2013/0144532 | A1 | 6/2013 | Williams et al. |
| 2013/0304437 | A1 | 11/2013 | Ma et al. |
| 2014/0052377 | A1* | 2/2014 | Downie .................. G01V 1/40 702/11 |
| 2014/0188447 | A1* | 7/2014 | Venkataraman ....... G01V 1/288 703/2 |
| 2014/0200811 | A1 | 7/2014 | Wuestefeld et al. |
| 2014/0216729 | A1* | 8/2014 | McKenna ............... G01V 1/42 166/250.1 |
| 2014/0305638 | A1 | 10/2014 | Kresse et al. |
| 2014/0372094 | A1 | 12/2014 | Holland et al. |
| 2015/0006082 | A1* | 1/2015 | Zhang .................. G01V 1/288 702/11 |
| 2015/0006124 | A1* | 1/2015 | Zhang .................. G06F 17/5009 703/2 |
| 2015/0285933 | A1 | 10/2015 | Grealy |
| 2015/0362608 | A1* | 12/2015 | Van Groenestijn ...... G01V 1/28 702/14 |
| 2016/0124100 | A1* | 5/2016 | Rawles .................. G01V 1/307 702/14 |
| 2016/0154129 | A1 | 6/2016 | Sayers et al. |
| 2016/0160642 | A1* | 6/2016 | Hall ....................... E21B 43/267 166/280.1 |
| 2017/0097431 | A1* | 4/2017 | McKenna .............. G01V 1/288 |
| 2018/0231677 | A1* | 8/2018 | Shojaei ................. G01V 1/288 |

FOREIGN PATENT DOCUMENTS

| | | |
|---|---|---|
| WO | 2012141720 A1 | 10/2012 |
| WO | 2013028237 A1 | 2/2013 |

OTHER PUBLICATIONS

Bachmann, et al., "Influence of pore-pressure on the event-size distribution of induced earthquakes", GeoPhysical Research Letters, vol. 39, L09302, doi:10.129/2012GL051480, 2012, 7 pages.

Borgos, et al., "Analysis of dynamic fracture behavior using 4D seismic data", SEG Houston 2009 International Exposition and Annual Meeting, pp. 3770-3774.

Bourne, et al.; "A Seismological Model for Earthquakes Induced by Fluid Extraction from a Subsurface Reservoir"; J. Geophys. Res. Solid Earth, (2014); 25 pages.

Bowman, et al.; "Determining Effective Hydraulic Fracture Volume Utilizing PSO and Seismic Deformation"; Frontiers+Innovation; (2009); CSPG CSEG CWLS Convention; 2 pages.

Brune, James N., "Tectonic Stress and the Spectra of Seismic Shear Waves from Earthquakes", Journal of Geophysical Research, vol. 75, No. 26, Sep. 10, 1970, pp. 4997-5009.

Cipolla, et al, "Engineering Guide to the Application of Microseismic Interpretations", SPE 152165, SPE Hydraulic Fracturing Technology Conference, The Woodlands, Texas, USA, Feb. 6-8, 2012, 24 pages.

Gutenberg, et al., "Earthquake Magnitude, Intensity, Energy, and Acceleration", Bulletin of the Seismological Society of America, vol. 32, No. 3, Jul. 1942, pp. 163-190.

Hanks, et al., "A Moment Magnitude Scale", Journal of Geophysical Research, vol. 84, No. B5, May 10, 1979, pp. 2348-2350.

Kanamori, et al., "Theoretical basis of Some Empirical Relatiosn in Seismology", Bulletin of the Seismological Society of America, vol. 65, No. 5., Oct. 1975, pp. 1073-1095.

Madariaga, Raul, "Dynamics of an Expanding Circular Fault", Bulletin of the Seismological, Society of America, vol. 66, No. 3, Jun. 1976, pp. 639-666.

McGarr, A., "Observations Constraining Near-Source Ground Motion Estimated from Locally Recorded Seismograms", Journal of Geophysical Research, vol. 96, No. B10, Sep. 10, 1991, pp. 16,495-508.

Minson et al, "Seismically and geodetically determined nondouble-couple source mechanisms from the 2000 Miyakejima volcanic earthquake swarm", Journal of Geophysical Research, vol. 112, B10308, doi: 10.1029/2006JB004847, 2007, 20 pages.

Muller, Gerhard, "Volume Change of Seismic Sources from Moment Tensors", Bulleting of the Seismological Society of America, 91, 4, pp. 880-884, Aug. 2001.

Shaprio, et al.; "Large-Scale in Situ Permeability Tensor of Rocks from Induced Microseismicity; Geophysical Journal International"; (1999); 7 pages.

Shemeta, et al.; "It's a Matter of Size: Magnitude and Moment Estimates for Microseismic Data"; The Leading Edge; (2010); 6 pages.

Vasco, et al.; "Estimating Permeability from Quasi-Static Deformation; Temporal Variations and Arrival-Time Inversion"; Geophys. vol. 73, No. 6, Nov.-Dec. 2008; 16 pages.

Woessner, et al., "Assessing the Quality of Earthquake Catalogues: Estimating the Magnitude of Completeness and Its Uncertainty", Bulleting of the Seismological Society of America, vol. 95, No. 2, pp. 684-698, Apr. 2005, doi: 10.1785/0120040007.

(56) References Cited

OTHER PUBLICATIONS

Maxwell, Shawn; "Beyond the SRV—The EPV Provides a More Accurate Determination of Reservoir Drainage in Shale Reservoirs"; E & P; Nov. 2013; 2 pages.

* cited by examiner

CORRECTIVE SCALING OF INTERPRETED FRACTURES BASED ON THE MICROSEISMIC DETECTION RANGE BIAS CORRECTION

BACKGROUND

To enhance the flow properties of a reservoir, a common practice is to inject fluid to create hydro-fractures or to enhance connections between existing fractures. This process is called stimulation. Microseismic monitoring using geophones is one of the few observational tools that provide information on this process. From the interpretation of the microseismic data, one can derive information on the in-situ stresses, the stimulation efficacy and the stimulated rock volume as well as other properties. Additionally, it is also common to interpret the geometry and extent of a fracture or fracture network from the microseismic event spatial spreading. Since the production of hydrocarbons can be expensive, it would be well received in the oil and gas industries if a method could be developed that would improve the accuracy of interpreting seismic monitoring data, such as for generating an accurate fracture model, and calculating a stimulated reservoir volume. Other industries such as the geothermal industry may also benefit from this method and apparatus.

BRIEF SUMMARY

Disclosed is a method for correcting a fracture model of a reservoir. The method includes: stimulating an earth reservoir using a stimulation apparatus configured to generate a plurality of seismic events in the reservoir; receiving a seismic signal having a magnitude from each seismic event in a plurality of seismic events that are in a plurality of stimulated stages in the reservoir to provide detected seismic event information in each of the stages, the seismic signal being received by an array of seismic receivers; and selecting a stage in the plurality of stages as a reference stage according to a selection criterion. The method also includes estimating a number of undetected seismic events and a magnitude for each of the undetected seismic events to provide undetected seismic event information for each stage in the plurality of stages, the number of undetected seismic events and corresponding magnitudes for each stage in the plurality of stages being estimated using each of the detected seismic events and corresponding magnitudes for the corresponding stage, wherein the detected seismic event information and the undetected seismic event information provide corrected seismic event information for each stage in the plurality of stages. The method further includes: determining a scalar property for each stage in the plurality of stages; calculating a scaling factor for each stage using the scalar property of the corresponding stage and the scalar property of the reference stage, the scaling factor relating the scalar property of the corresponding stage to the scalar property of the reference stage; applying the scaling factor for each stage to the corrected seismic event information for the corresponding stage to provide scaled seismic event information for each stage in the plurality of stages; and correcting the fracture model with the scaled seismic event information for each stage in the plurality of stages to provide a corrected fracture model; wherein the receiving, selecting, estimating, determining, calculating, applying and correcting are implemented by an algorithm executed by a processor.

Also disclosed is a method for generating a fracture model of a reservoir. The method includes receiving a seismic signal having a magnitude from each seismic event in a plurality of seismic events that are in a plurality of stimulated stages in the reservoir to provide detected seismic event information in each of the stages, the seismic signal being received by an array of seismic receivers and selecting a stage in the plurality of stages as a reference stage according to a selection criterion. The method also includes estimating a number of undetected seismic events and a magnitude for each of the undetected seismic events to provide undetected seismic event information for each stage in the plurality of stages, the number of undetected seismic events and corresponding magnitudes for each stage in the plurality of stages being estimated using each of the detected seismic events and corresponding magnitudes for the corresponding stage, wherein the detected seismic event information and the undetected seismic event information provide corrected seismic event information for each stage in the plurality of stages. The method further includes: determining a scalar property for each stage in the plurality of stages; calculating a scaling factor for each stage using the scalar property of the corresponding stage and the scalar property of the reference stage, the scaling factor relating the scalar property of the corresponding stage to the scalar property of the reference stage; applying the scaling factor for each stage to the corrected seismic event information for the corresponding stage to provide scaled seismic event information for each stage in the plurality of stages; generating the fracture model with the scaled seismic event information for each stage in the plurality of stages to provide a corrected fracture model; and transmitting, using an output interface, a signal comprising the generated fracture model to a signal receiving device; wherein the receiving, selecting, estimating, determining, calculating, applying and correcting are implemented by an algorithm executed by a processor.

Further disclosed is a non-transitory computer readable medium comprising computer executable instructions for correcting a fracture model of a reservoir that when executed by a computer implements a method. The method includes receiving a seismic signal having a magnitude from each seismic event in a plurality of seismic events that are in a plurality of stimulated stages in the reservoir to provide detected seismic event information in each of the stages, the seismic signal being received by an array of seismic receivers and selecting a stage in the plurality of stages as a reference stage according to a selection criterion. The method also includes estimating a number of undetected seismic events and a magnitude for each of the undetected seismic events to provide undetected seismic event information for each stage in the plurality of stages, the number of undetected seismic events and corresponding magnitudes for each stage in the plurality of stages being estimated using each of the detected seismic events and corresponding magnitudes for the corresponding stage, wherein the detected seismic event information and the undetected seismic event information provide corrected seismic event information for each stage in the plurality of stages. The method further includes: determining a scalar property for each stage in the plurality of stages; calculating a scaling factor for each stage using the scalar property of the corresponding stage and the scalar property of the reference stage, the scaling factor relating the scalar property of the corresponding stage to the scalar property of the reference stage; applying the scaling factor for each stage to the corrected seismic event information for the corresponding stage to provide scaled seismic event information for each stage in the plurality of stages; correcting the fracture model with the scaled seismic event information for each stage in the plurality of stages to provide a corrected fracture model; and transmitting, using an output interface, a signal comprising the corrected fracture model to a signal receiving device.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
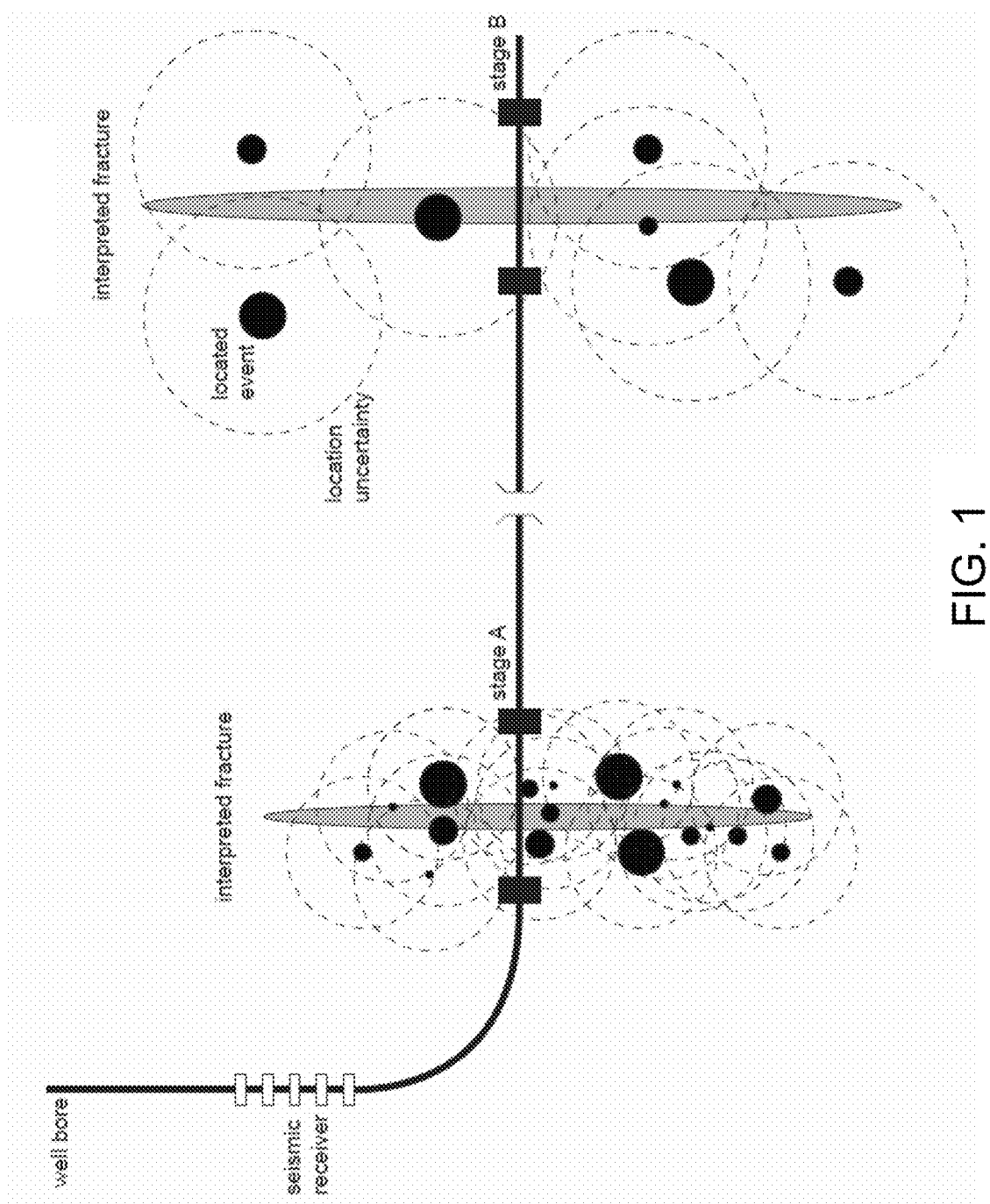
FIG. 1 depicts aspects of observations in microseismic data acquisition for an example having two stimulation stages in a reservoir.

A detailed description of one or more embodiments of the disclosed apparatus and method presented herein by way of exemplification and not limitation with reference to the figures.

To enhance the flow properties of a reservoir a common practice is to inject fluid to create hydro-fractures and/or to enhance connection between the existing fracture networks. This process is called stimulation. When a reservoir is stimulated, such as by hydraulic fracturing or water injection as non-limiting embodiment, a plurality of ruptures may be caused in the formation by this stimulation. All of the ruptured planes together indicate a stimulated rock or reservoir volume.

When a rupture (i.e., a microseismic event) occurs, seismic waves are radiated from the rupture through the formation and earth. In turn, the location, magnitude and moment (i.e., mechanical character) of a microseismic event are encoded in the characteristics of the radiated seismic waves. These generate seismic signals having an amplitude that varies with time and locations. The seismic signals are sensed and recorded using seismic receivers disposed below ground or on the surface. Using seismic signal processing techniques, such as triangulation for example, the size and location of each sensed event can be estimated. We call this process microseismic monitoring. The microseismic monitoring product is microseismic event catalog. The event catalog contains a plurality of event. Mostly, event location, size (indicated by magnitude) and time are the basic attributes. In some cases more event attributes, such as moment tensor, etc. are also included. Hence, some seismic data available for processing using the methods disclosed herein may include only location and magnitude or scalar moment while other data may include the moment tensor.

In general, the total seismic wave includes a P-wave and an S-wave. The P-wave has higher speed than the S-wave. Noting that it takes a longer time for a seismic signal to reach a receiver that is farther away from a seismic event than a receiver that is closer, the event location can be derived from the arrival time difference of the received P and/or S signals from all receivers or the separation measured between the recorded P-wave and S-wave for the same receiver. Using this information and the speed and magnitude of the seismic waves, the magnitude and location of seismic or microseismic events can be calculated. For reference purposes, seismic events having very small magnitude signals may be referred to as microseismic events while corresponding seismic signals having very small magnitudes may be referred to as microseismic signals. Further, while the techniques discussed herein may refer to microseismic events, the term "microseismic events" is not intended to be limiting and, hence, the techniques are also applicable to seismic events. As the techniques for analyzing seismic waves to determine fracture metrics, such as rupture location, rupture area, rupture displacement, and rupture plane orientation, using an array of seismic receivers is well known in the art, these techniques are not discussed in further detail.

Microseismic monitoring is one of the few observational tools that provide information on the rupture process due to stimulation, including event location and magnitude. Because all of the ruptured planes together indicate a stimulated rock or reservoir volume, so it is very common to interpret the geometry and extent of a fracture or fracture network from the microseismic event spatial spreading. The term "spatial spreading" relates to the distribution of a set of microseismic events over a volume. Because the microseismic event size and energy released can differ very much, it is important to use the right attributes that can refer to this difference in energy release.

The aim for using microseismic attributes is to tie the attributes directly to a change in permeability of the reservoir. The permeability change due to stimulation is a direct measure of the efficacy of the stimulation and the resulting permeability is a key parameter for a flow rate calculation. Microseismic attributes, which can be used for this purpose, are based on deformation and can be added together based on physical relationships. Non-limiting examples of such attributes are scalar moment, deformed volume and fracture area.

As disclosed herein, the microseismic attribute scalar moment, $M_0 = \mu A D$, is used to describe seismic deformation volume due to fracture or rupture of formation rock where $\mu$ is shear modulus, D is average displacement of the rupture, and A is the area of the rupture. The deformed volume caused by a seismic event (i.e., fracture or rupture) with scalar moment $M_0$ is $\Delta V = AD$ and is used to describe the stimulated rock volume. The scalar seismic moment is one measure of the microseismic event size and energy released. Alternatively, other attributes based on the seismic deformation may also be used.

The quality a microseismic dataset is heavy influenced by the seismic monitoring array on which the data was originally recorded. Two phenomena in respect to the microseismic data are relevant. First, the spatial uncertainty of an event increases with distance to the receiver array as illustrated in FIG. 1. Therefore, the microseismic cloud related to a more distant fracture is generally less well-defined and is likely to occupy a larger volume. The term "cloud" refers to the multitude of interpreted locations of the microseismic events related to a single fracture. The more distant microseismic clouds could therefore appear larger than the real fractured volume. FIG. 1 illustrates a sketch of two stages on a well bore. The term "stage" refers to a section of a borehole that is isolated, generally by packers, in which a stimulation treatment is applied and corresponding microseismic data is acquired. Stage "A" is closer to the receiver array showing a denser, better-defined microseismic cloud, whereas stage "B" has fewer events which have a larger scatter.

Figure 2:
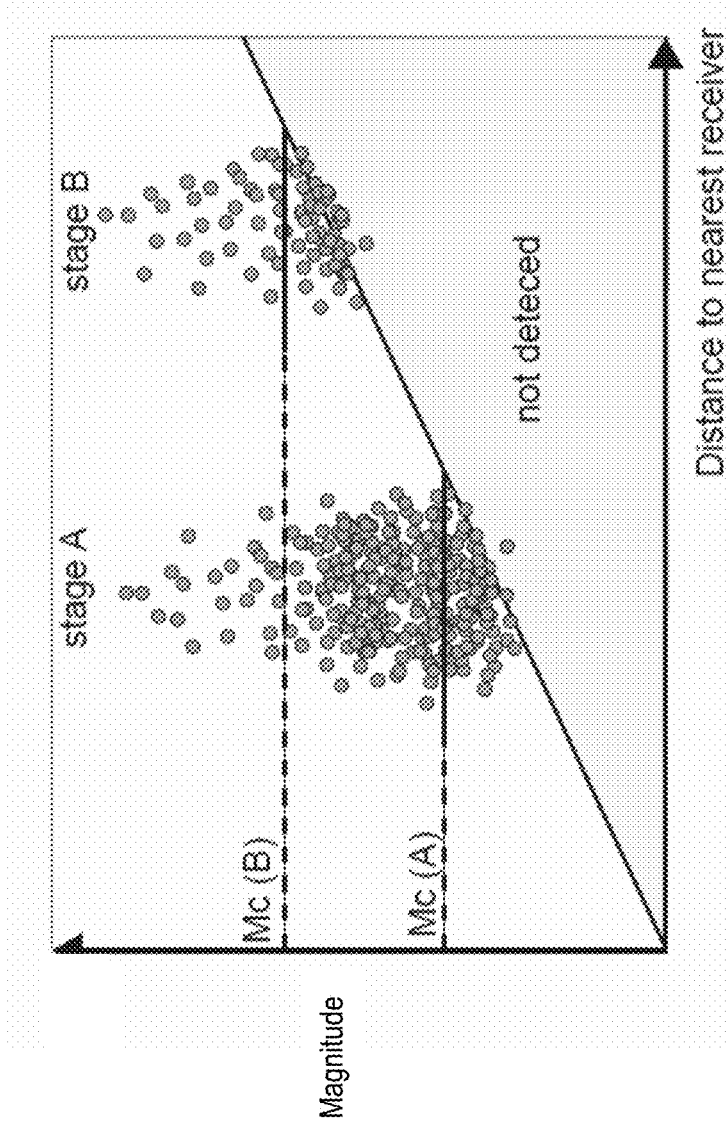
FIG. 2 depicts aspects of detection range bias.
Figure 6:
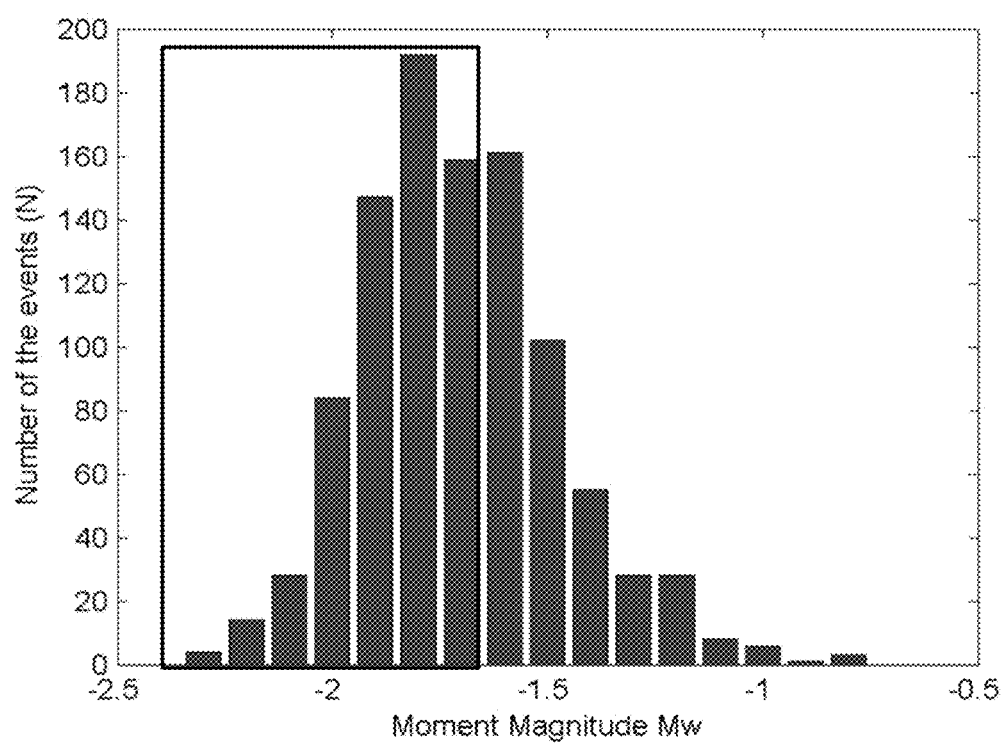
FIG. 6 is a microseismic event magnitude histogram illustrating the population of detected seismic events.

The second phenomenon is related to amplitude attenuation. The amplitude of radiated seismic waves decreases with travel distance. Accordingly, bigger events with strong seismic signals have a higher likelihood of detection. This is because there are microseismic events, that even though they occur close to a receiver, they cannot be detected either due to their amplitude being below background noise, or due to the event being beyond the receiver's range of sensitivity. Therefore, with increasing distance to the receiver array, the ability to detect small size events decreases. Low energy or small magnitude events in distant locations are not picked up by the seismic receivers and are therefore underrepresented in the detected population. This phenomenon leads to a "detection range bias" in which the total released energy or deformation of the microseismic dataset can be misinterpreted as illustrated in FIG. 2. As illustrated in FIG. 2, small microseismic events from more distant locations are not fully detected. All detected populations draw an incomplete picture of the actual populations with a dependency on the distance. This is called the "detection range bias". Based on the distance to the nearest location, a magnitude of completeness (Mc) can be determined above which the population can be considered representative. Consequently more distant populations have a higher Mc and fewer interpreted events. This in turn may create more difficulties to quantitatively link the microseismic clouds to the potential fracture geometry, i.e. size or shape of the distant stages and localize its exact position. So a reasonable estimation of undetected events may be made from an event magnitude histogram estimation as illustrated in the example in FIG. 6. Based on this event magnitude histogram, the conclusion may be drawn that the events with magnitude below −1.6 (illustrated in the rectangular box) are not completely detected for this data set because the events below −1.6 do not follow the power law relationship.

Two practices may be employed during the interpretation of the fractures estimated from the seismic data. First, the location of the microseismic events may taken "as-is". It is known that the location uncertainty grows with larger distances to the seismic receivers, but there is typically no correction or indication of this phenomenon in prior art analysis. Second, characteristics of the microseismic event population, such as undetected events, have not previously been taken into account.

Figure 3:
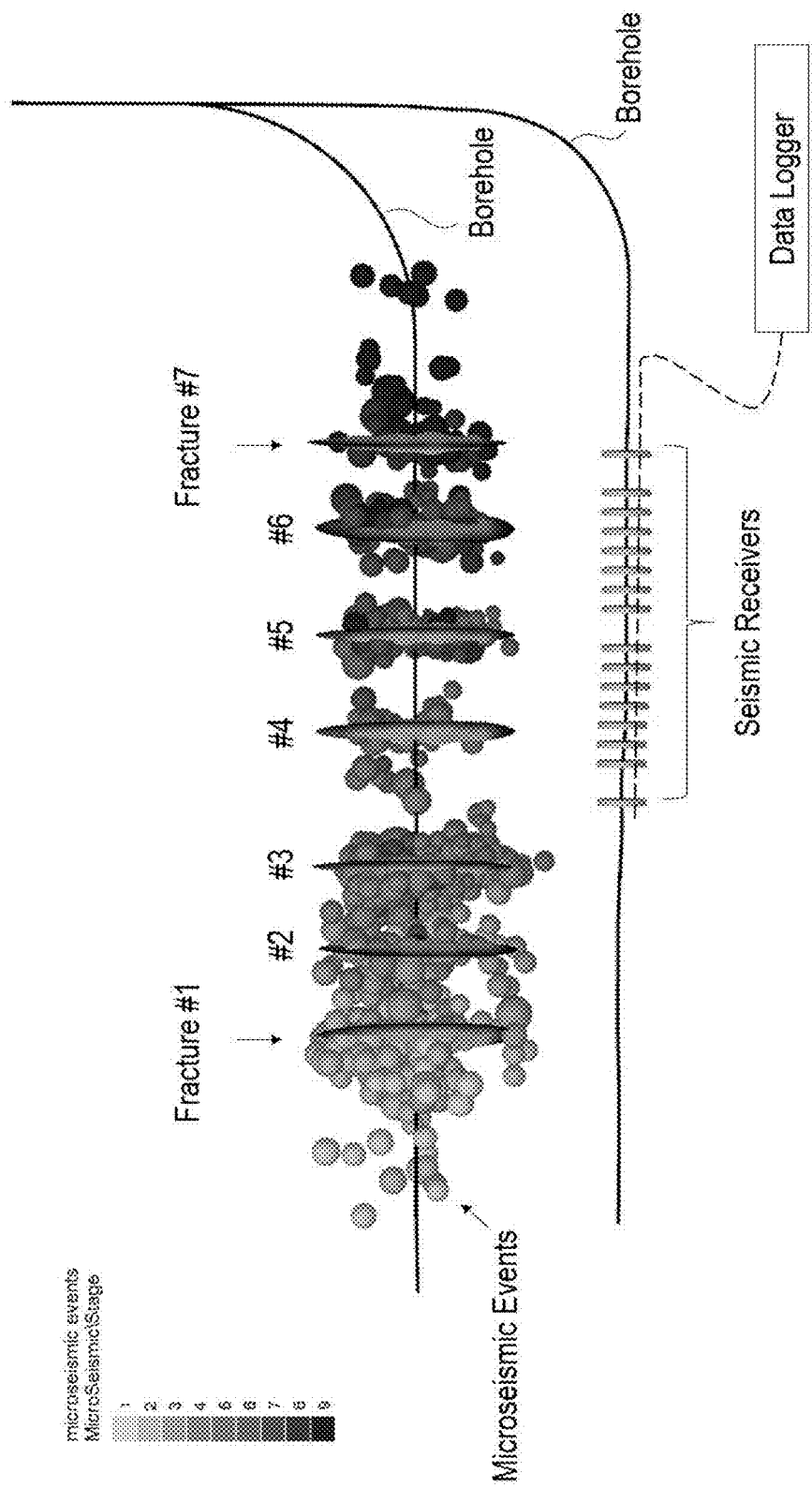
FIG. 3 illustrates a side view of an example of receiving seismic event data from a borehole in a reservoir due to nine stages of stimulation of the reservoir.
Figure 4:
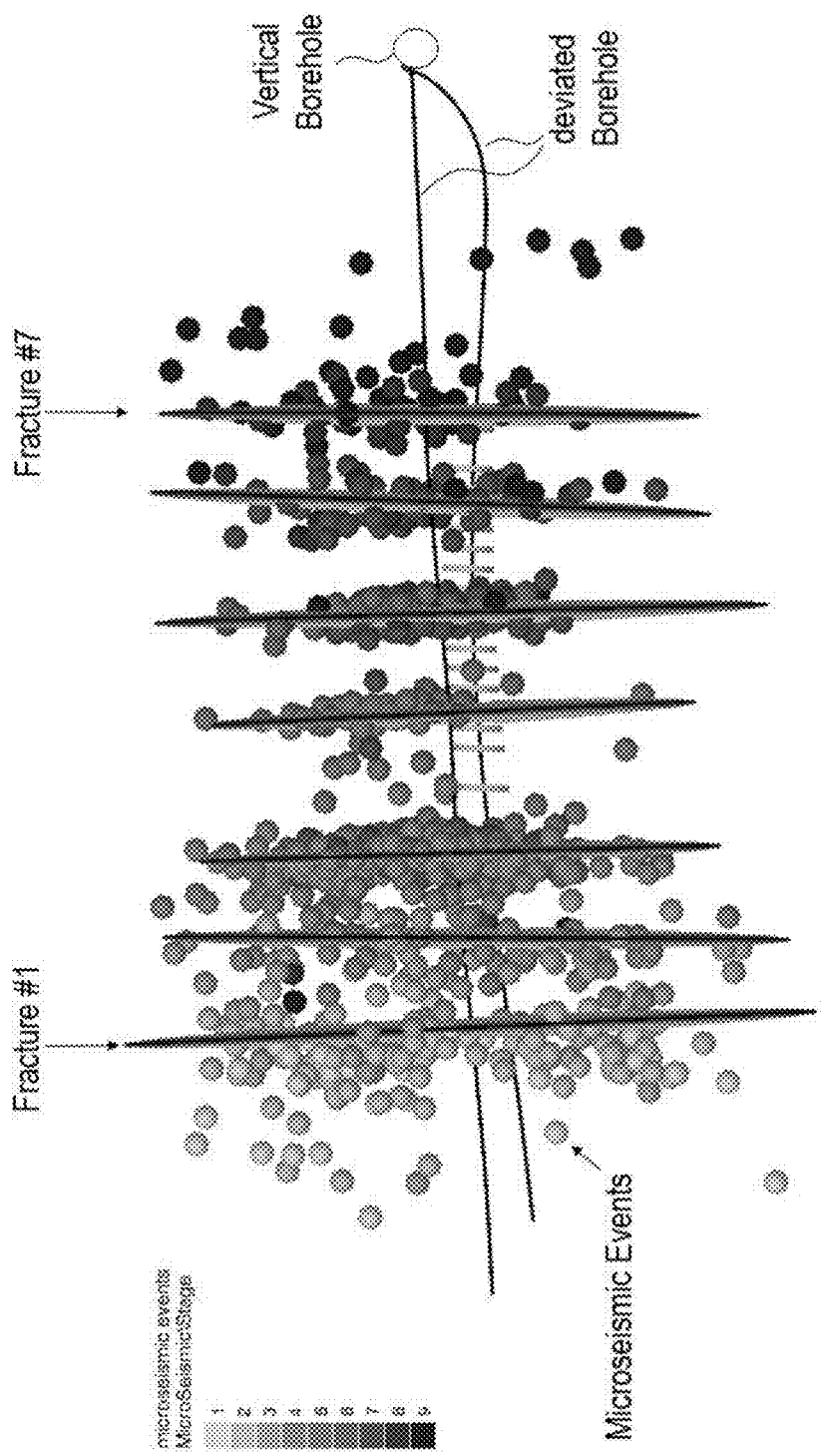
FIG. 4 illustrates a top view the example of receiving seismic event data from nine stages of stimulation of a reservoir.

With these practices many fracture interpretations are biased in respect to the distance to the receiver and proximal fractures are interpreted with smaller sizes as opposed to distal fractures. An example is illustrated in FIGS. 3 and 4. Here, the interpreted distal fractures (Fractures #1-3) are larger as opposed to the interpreted proximal fractures (Fractures #4-7). FIG. 3 is a side view of an example project. The seismic receivers are displayed as vertical disks on the lower well bore whereas the detected microseismic events and the interpreted fractures are shown on the upper wellbore. The events are color-coded by the nine stages. FIG. 4 presents a top view of this example project. Note that in FIG. 4 the outer stages, which are further away from the seismic receivers, show less clustering and more scatter. Especially from stage 5 down to stage 1, there is a trend to interpret growing fracture sizes towards the outside. This effect is not present on the stages 7-9 as they are located closer to the receiver arrays.

Information derived from the interpreted fractures is used in e.g. reservoir simulations. Inaccurate interpretations of these features can therefore have implications on production and development plans of the reservoir up to economic decisions. For this reason an accurate representation of the fractures is beneficial.

Disclosed are methods for correcting a fracture model and estimating a stimulated reservoir volume in an earth formation with improved accuracy by accounting for spatial uncertainty and the detection range bias of microseismic data. The term "fracture model" relates to dimensions and locations of interpreted or inferred fractures within a reservoir. The fracture model may include connections between fractures and may thus be referred to as a "fracture network." The fracture model may be displayed as a map to a user or it may be digitally encoded for storage or further processing. The term "stimulated reservoir volume" relates to a volume in an earth formation reservoir that is effectively stimulated, in which the permeability of the volume is increased to allow for a sufficient portion of the fluid being extracted; therefore it will increase the performance (e.g., flow rate) of a well. The stimulated reservoir volume is thus a measure of the efficacy of a stimulus treatment applied to the formation such as fracturing.

Two factors are taken into account in using microseismic clouds to derive fracture network geometry. First, the interpreted fracture geometry is mostly biased by the microseismic spatial uncertainty. Second, due to detection range bias more small events are undetected with increasing distance to the receiver array. In order to accommodate these factors, a two-step approach is disclosed herein in linking microseismic clouds to fracture geometry. The first step is to account for undetected microseismic events in all stages of stimulation. The second step is to correct for the microseismic spatial uncertainty for both detected and undetected events is all of the stages of stimulation.

Figures 5A, 5B:
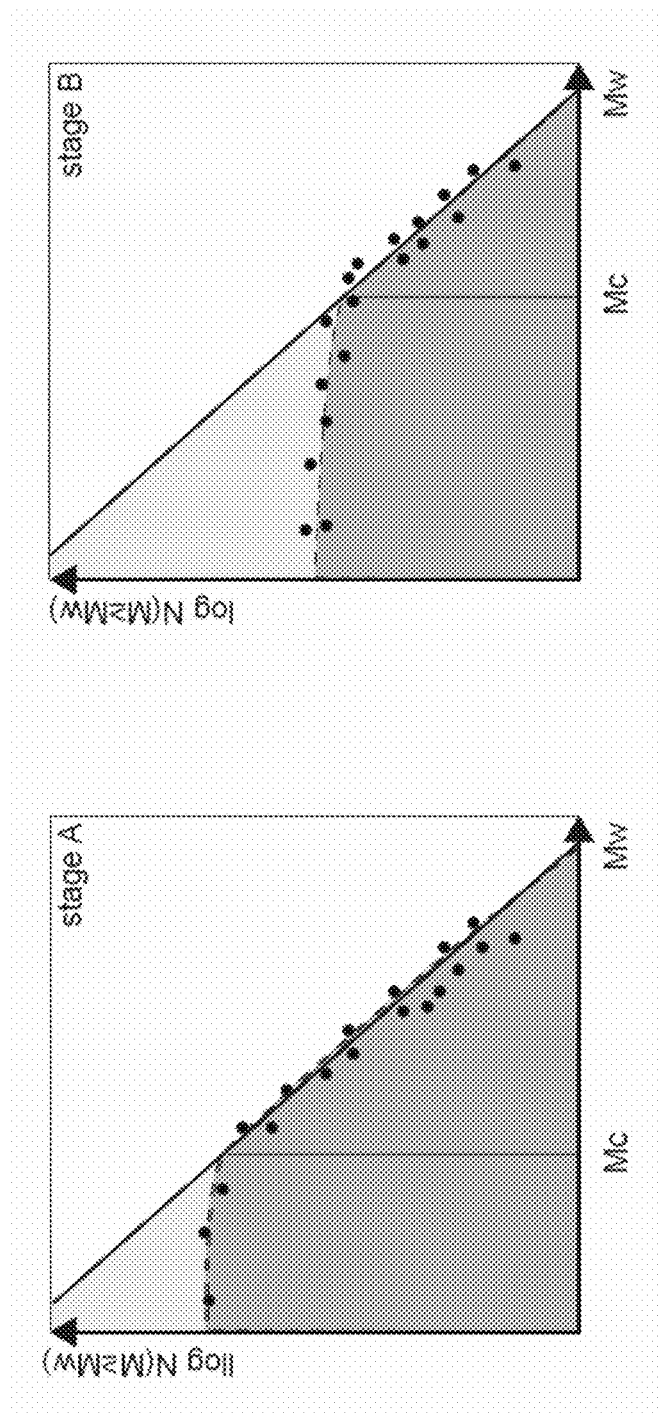
FIGS. 5A and 5B, collectively referred to as FIG. 5, depict aspects of the Gutenberg-Richter relationship for the two stimulation stages example.

Next, a methodology for the first step of accounting for undetected microseismic events is discussed. From analysis of detected microseismic events, undetected microseismic events can be identified based on the Gutenberg-Richter law (Gutenberg & Richter, 1942). Using the Gutenberg-Richter law, a population of microseismic events (e.g. per stage) is used to constrain the linear part of the Gutenberg-Richter relationship up to the magnitude of completeness (Mc) (discussed below) of the population. Mc is the marking of the magnitude where the population starts to deviate from the linear trend. FIG. 5 illustrates this for the scenario previously shown in FIGS. 1 and 2 (FIG. 5A for stage "A" and FIG. 5B for stage "B"). Due to the detection range bias, the detected population deviates from this relationship as smaller events are underrepresented when having magnitudes smaller than the magnitude of completeness. The detected events from the closer stage "A" have a lower magnitude of completeness for which the Gutenberg-Richter relationship is valid for a large fraction of the population. The counterpart for the more distant stage "B" shows the trend to kink off at a much higher magnitude of completeness due to the greater distance to the receivers. By fitting a linear trend line for events larger than the magnitude of completeness, the theoretical population can be estimated which fully represents the released energy of the system.

In a simple case when only one string of downhole vertical receiver array is involved, the event detection limit is often a linear function of the distance of each event from the receiver array as illustrated in FIG. 2 where stage "B" events are further away from the receiver than stage "A" events. With more complicated monitoring arrays, for a given event location, the event detection limit may still have a linear relationship with distance to receivers, but more factors are involved, such as signal to noise ratio difference between surface and downhole receivers. However, from the Gutenberg-Richter law, which relates a number of seismic events that occur to their magnitudes, the number of events and their magnitudes follow a power law relationship. The Gutenberg-Richter law may be written as: $\log(N) = a + b \cdot M_w$, where $M_w$ is the moment magnitude and a and b are coefficients. The moment magnitude may be derived from the magnitude of the seismic signal (e.g., a maximum amplitude and an amplitude spectrum), which may be referred to in the art as the seismograph signal. It can be appreciated that magnitudes other than the moment magnitude may be used in a power law relationship to relate a number of seismic events that occur to their magnitudes. In that determining the moment magnitude from the magnitude of the seismic signal is known in the art, this determination is not discussed in further detail.

Figure 7:
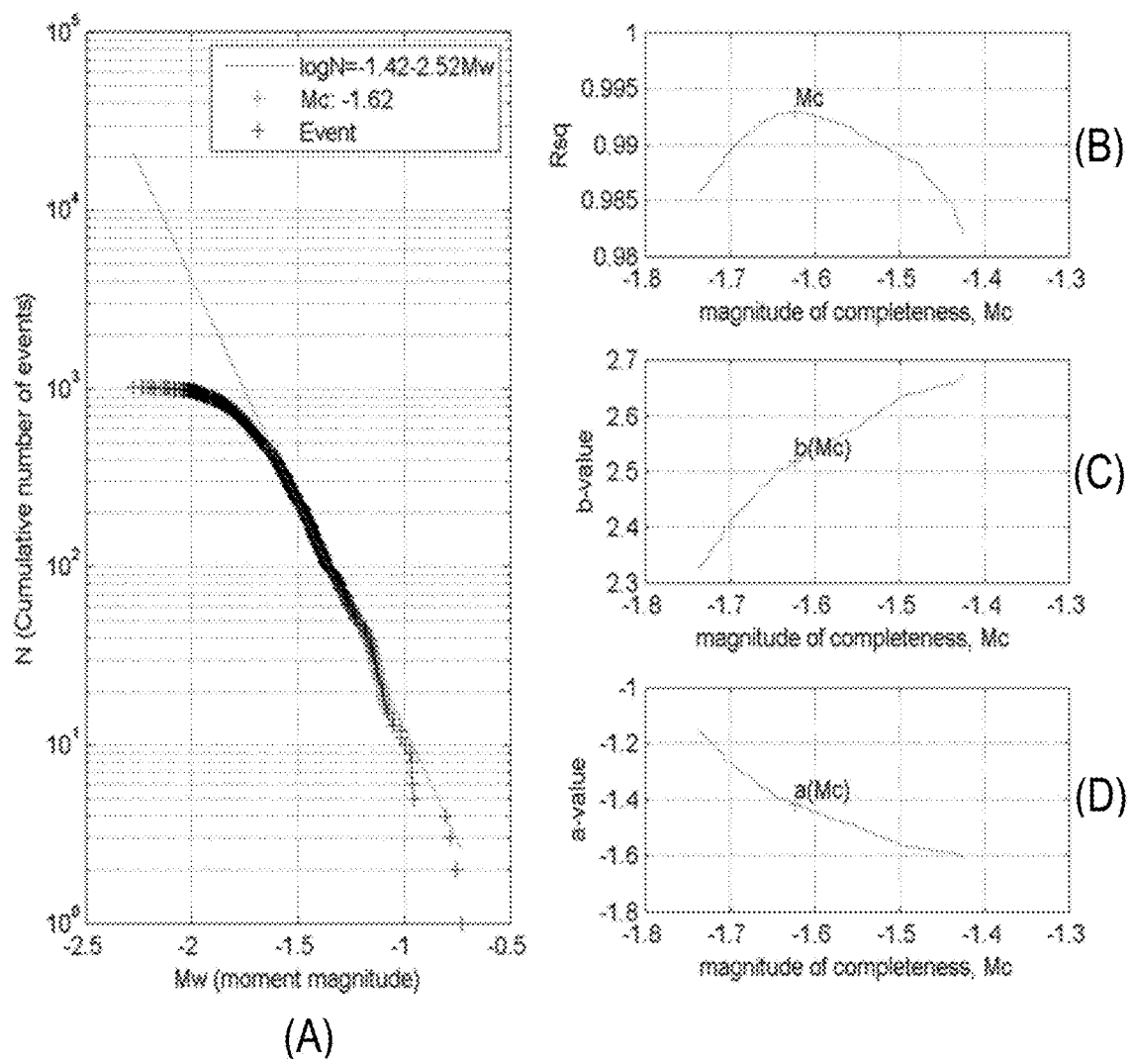
FIGS. 7A-7D, collectively referred to as FIG. 7, depict aspects of quantifying a number of undetected microseismic events and associated magnitudes.

The method disclosed herein provides more accuracy than that provided from a general histogram interpretation. Several statistical methods may be used without limiting the disclosure herein. One method discussed here is based on a statistical best fitting method. Aspects of this method as depicted in FIG. 7. In FIG. 7A, the magnitude of each detected microseismic event and the frequency of occurrence of events having that magnitude or greater magnitude (i.e., the cumulative number of events having that magnitude or greater magnitude) are illustrated. The crosses in this figure indicate data points while the straight line is the prediction of the Gutenberg-Richter power law. The magnitude of completeness occurs approximately where the data departs from the straight line and is −1.62 for this example. FIG. 7B illustrates the regression of data using the least square method versus the magnitude of completeness. It can be seen that the regression has a maximum value where the magnitude of completeness is −1.62. FIGS. 7C and 7D illustrate the b-value and a-value versus magnitude of completion, respectively. Thus, from these figures the appropriate a- and b-values can be selected for the magnitude of completeness of −1.62. Hence by knowing the a- and b-values of the Gutenberg-Richter power law, the number of undetected microseismic events and their moment magnitude can be estimated. It can be appreciated that any of several known statistical methods for fitting a curve to data may be used on the whole data set, on only the data above the magnitude of completeness, or on some combination of data above and below the magnitude of completeness.

Figure 8:
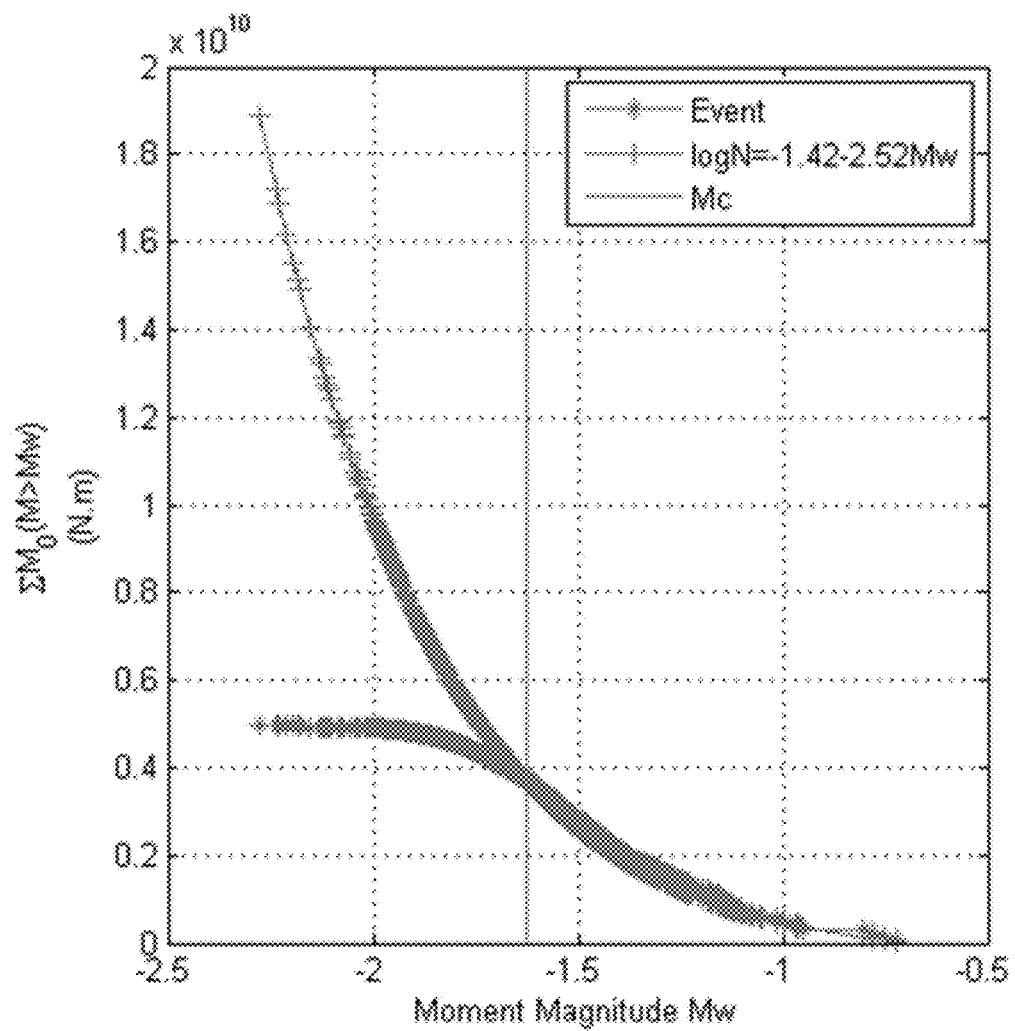
FIG. 8 illustrates a graph of cumulative scalar seismic moment versus moment magnitude.

As discussed previously, the stimulated reservoir volume can be estimated by summing the scalar moment (or other deformation based attribute) for each detected microseismic event and, in addition, summing the estimated scalar moment (or other deformation based attribute) for each of an estimated number of undetected microseismic events. The cumulative moment may be written as:

$$\sum M_0 = \sum_{Mw} N_{dis}(Mw) * M_0(Mw)$$

where $M_0$ is the scalar moment in N·m ($10^7$ dyne·cm), Mw is the moment magnitude, and $N_{dis}(Mw)$ is the discrete number of events with that magnitude (i.e., the frequency of occurrence of events with that magnitude). The relationship between the moment magnitude and the scalar moment may be written as: $Mw = (2/3) \log M_0 - 6.0$. Using the same data set that was used in FIG. 7A, the cumulative scalar seismic moment $\Sigma M_0$ versus the moment magnitude is plotted in FIG. 8. It can be seen that approximately 75% of the corrected cumulative seismic moment is from the inferred undetected microseismic events. Hence, by not accounting for the undetected microseismic events, the non-corrected cumulative moment and therefore the efficacy of the stimulation may be significantly underestimated.

Figure 9B:
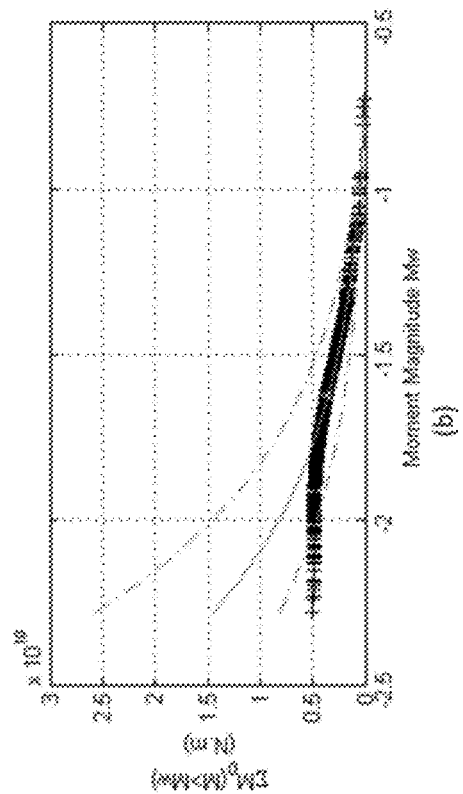
FIGS. 9A and 9B, collectively referred to as FIG. 9, depict aspects of perturbing the b-value in the Gutenberg-Richter power law relation.
Figure 9A:
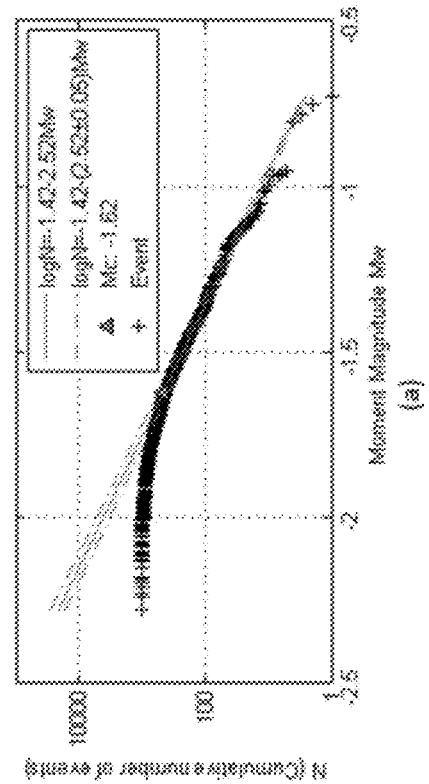
Figure 10:
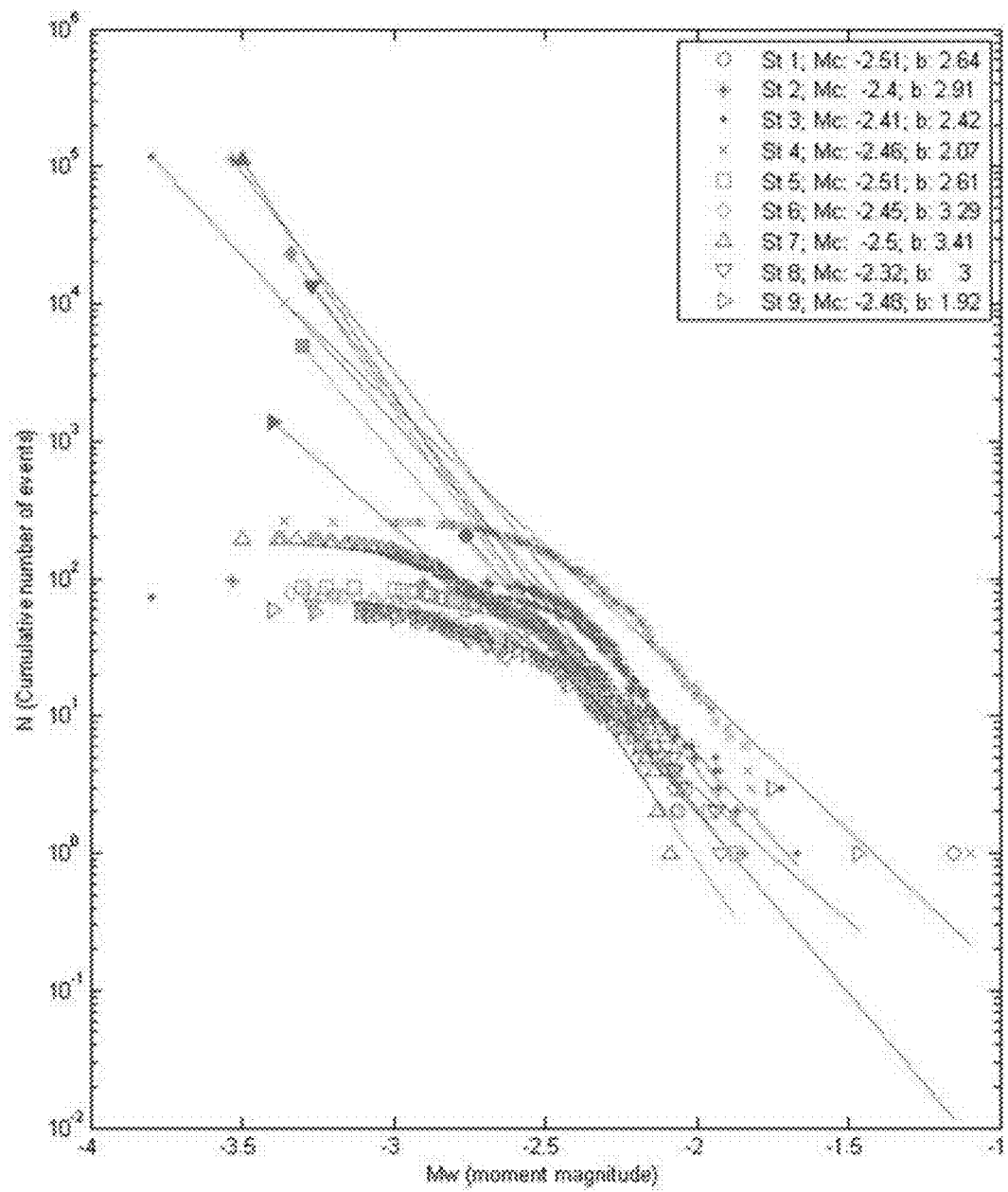
FIG. 10 illustrates microseismic data obtained from local volumes in a reservoir.

Next, the influence of the b-value on the cumulative scalar seismic moment $\Sigma M_0$ is discussed with reference to FIG. 9. FIG. 9A illustrates the Gutenberg-Richter power law with b-value perturbation of +/−0.05 and FIG. 9B illustrates the resulting cumulative scalar seismic moment resulting from the perturbation. As can be seen in FIG. 9B, a slight change in the b-value may cause a substantial change in the cumulative scalar moment. If sufficient data is available, then in one or more embodiments the b-value can be determined locally. That is, b-values in reservoir volumes close (i.e., local) to seismic receivers can be determined with improved accuracy, thus accounting for spatial variations in formation properties. If any local data population is too small to determine a local b-value, then a global b-value may be used for that local volume. FIG. 10 illustrates data obtained from nine stimulation treatments referred to as stages (St) where each succeeding stage is approximately 100 meters apart along a horizontal well. The Gutenberg-Richter power law relation is plotted for each of the stages and the magnitude of completeness and the b-value for each stage is listed. The local corrected cumulative scalar seismic moment for each stage, determined with local a and b-values may be used to compare stimulation efficacy between stages, and may be summed to provide the total scalar seismic moment for the total reservoir volume.

Figure 11:
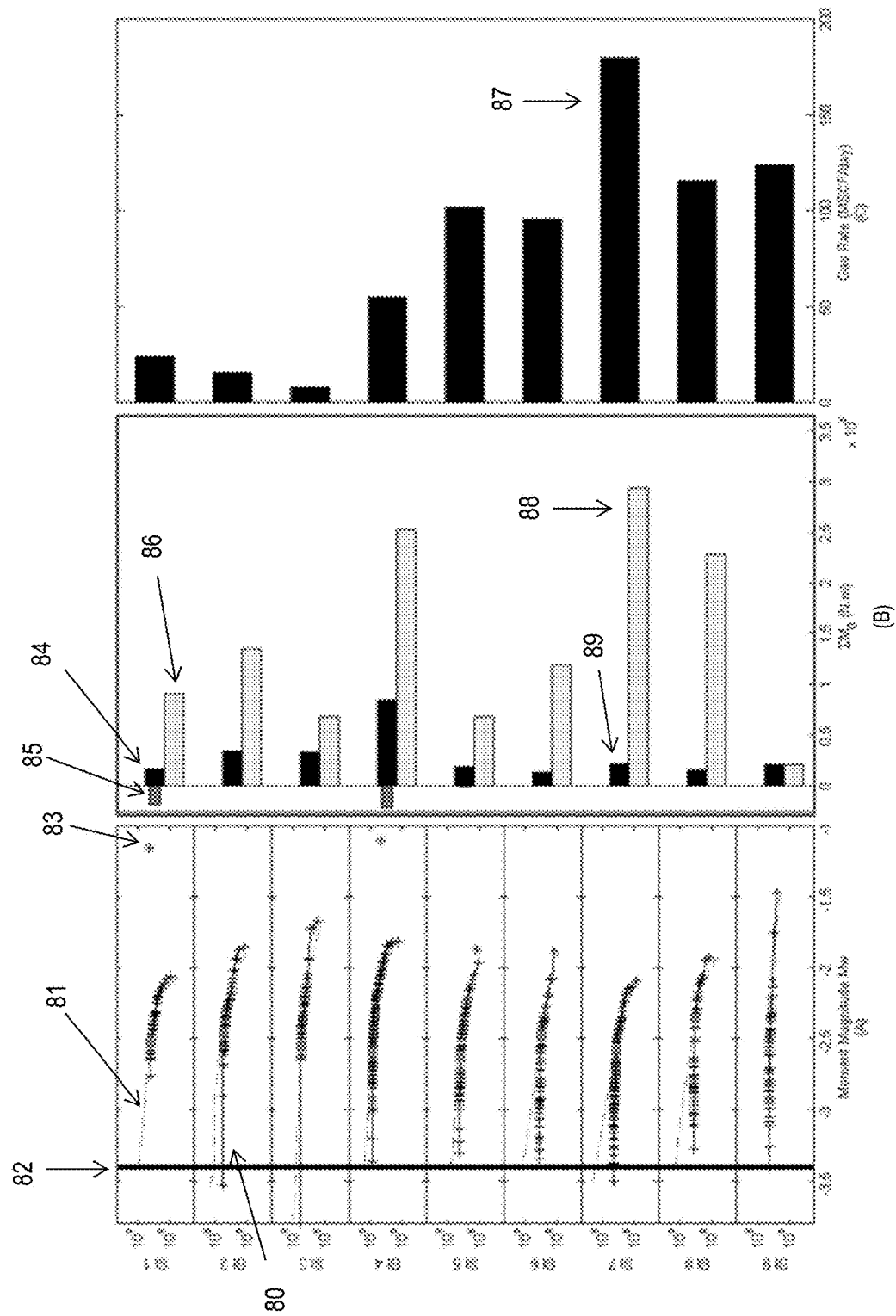
FIGS. 11A-11C, collectively referred to as FIG. 11, depict aspects of adding the undetected events back into the microseismic attribute counting and comparing the result with an observed flow rate.

FIG. 11 depicts aspects of adding the undetected events back to the microseismic attributes (e.g., scalar moment) counting, and its added value with respect to the flow rate (or production rate). FIG. 11A illustrates the cumulative scalar moment versus magnitude curves for each stage where the lines 80 with cross markers indicate the detected microseismic data, the dashed lines 81 are estimated cumulative scalar moments from the Gutenberg-Richter coefficients as illustrated in FIG. 10. The vertical line 82 indicates a selected minimum event to start counting for the cumulative scalar moment illustrated in FIG. 11B. The value of the selected minimum event in this example is −3.4 Mw. The circled cross 83 indicates outliers, which are data points with large residuals and/or high leverage. Outliers may distort the outcome and accuracy of the statistical fitting. They can be either automatically identified by calculating a "Cook's distance", by any other known methods, or a subjective choice. FIG. 11B illustrates the cumulative scalar moment in bars for each stage. The upper bars 84 are from the summed attributes from the detected microseismic events. The bars 85 to the left are the outliers, and the lower bars 86 are from the summation of the corrected microseismic events, so the undetected events are accounted for as well. FIG. 11C illustrates the observed production data in "Thousand Standard Cubic Feet (MSCF) per day" for each stage. Looking at stage 7, it can be seen that the bar 88 (where the undetected events are counted) correlate with the observed production data 87 much better than the bar 89 (where the undetected events are not counted).

A physically meaningful way to compare the stimulation efficacy between local volumes and/or stages is to compare them from a unique magnitude threshold onwards toward greater magnitudes. This magnitude threshold can be event magnitude, rupture size, etc. This unique magnitude, due to detection range bias, is often on the high magnitude side as illustrated on right side of FIG. 2 where the upper horizontal line intersects the detection limit line. Thus, the microseismic information provided the lower magnitude range in which only part of the events are detected will be missed. By showing the influence of the b-value and the magnitude of completeness, the energy released by these events below this unique threshold can be substantial and should not be ignored. So in order to push this unique magnitude threshold down, if this unique magnitude is below part or all of the local magnitude of completeness, the missing part is added back accordingly to make the comparison possible. This is supported by the data in FIG. 11. FIG. 11B illustrates the cumulative scalar moment in bars for each stage. The upper bars 84 are from the summed attributes from the detected microseismic events. The bars 85 to the left are the outliers, and the lower bars 86 are from the summation of the corrected microseismic events, so the undetected events are accounted for as well. FIG. 11C illustrates the observed production data in "Thousand Standard Cubic Feet (MSCF) per day" for each stage. Looking at stage 7, it can be seen that the bar 88 (where the undetected events are counted) correlate with the observed production data 87 much better than the bar 89 (where the undetected events are not counted).

Figure 12:
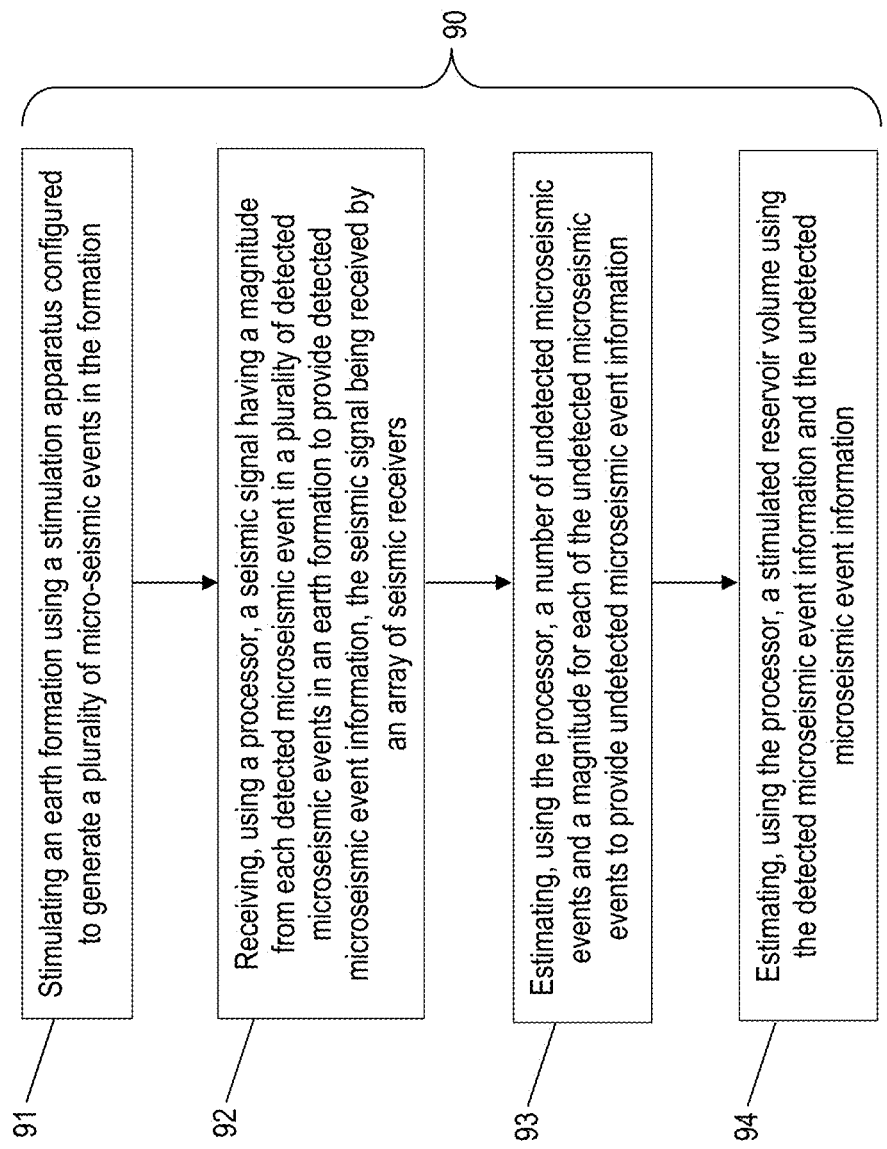
FIG. 12 is a flow chart for a method for estimating a volume of a stimulated reservoir.

FIG. 12 is a flow chart for a method 90 for estimating a volume of a stimulated reservoir. Block 91 calls for stimulating an earth formation using a stimulation apparatus configured to generate a plurality of microseismic events in the formation. Block 92 calls for receiving, using a processor, a seismic signal having a magnitude from each detected microseismic event in a plurality of detected microseismic events in the earth formation to provide detected microseismic event information, the seismic signal being received by an array of seismic receivers. The detected microseismic event information may include a location and/or magnitude of each detected microseismic event. Further, block 92 may include determining a scalar attribute, such as moment magnitude (Mw), from a magnitude of the seismic signal. Further, block 92 may include calculating a microseismic scalar moment magnitude ($M_O$) as the scalar attribute using the moment magnitude as input.

Block 93 calls for estimating, using the processor, a number of undetected microseismic events and a magnitude for each of the undetected microseismic events to provide undetected microseismic event information. The number of undetected microseismic events and corresponding magnitudes are estimated using each of the detected microseismic events and corresponding magnitudes in the plurality. The undetected microseismic event information may include a number of undetected microseismic events and a corresponding magnitude or moment magnitude (Mw) for each of the undetected events. In addition, a scalar attribute, such as a microseismic scalar moment magnitude ($M_O$) may be determined from the moment magnitude for each undetected event. The number of undetected events and the magnitude associated with each undetected event may be estimated from a mathematical relationship that relates a magnitude of a microseismic event to a number of estimated microseismic events having that magnitude or a cumulative number of events at that magnitude or greater magnitude. In one or more embodiments, the mathematical relationship is a power law relationship such as the Gutenberg-Richter power law relationship, although other mathematical relationships may be used. In one or more embodiments, the selected mathematical relationship is fit to the data from the detected microseismic events in the plurality. At a selected range of points on a curve of the mathematical relationship where the data departs the mathematical relationship, the mathematical relationship itself is used to provide the data (i.e., number of undetected events and corresponding magnitudes) for the undetected microseismic events. A threshold value related to determining where the data departs from the mathematical relationship curve (e.g., 2% deviation) may be selected. Alternatively, a statistical best fitting approach such as in FIG. 7 may be used to determine where the data departs from the mathematical relationship based on a selected standard deviation value.

Block 94 calls for estimating, using the processor, the stimulated reservoir volume using the detected microseismic event information and the undetected microseismic event information. Block 94 may include summing the scalar attributes, such as the microseismic scalar moment magnitude ($M_O$), from a selected minimum value onwards, for the detected events and the undetected events in order to estimate the efficacy of the stimulation. In one or more embodiments, a scalar attribute density may also be used. The scalar attribute and/or scalar attribute density of each local volume or stimulation stage provides a measure of the efficacy of stimulation for the corresponding local volume or stimulation stage. The permeability for each local volume or stimulation stage in the stimulated reservoir volume could be made proportional to the scalar attribute or the scalar attribute density of the corresponding local volume or stimulation stage to provide a permeability of the stimulated reservoir volume with spatial or stage variations based on the microseismic event data. Alternatively, the flow rate can be made proportional to the scalar attribute or attribute density when such a relation is more desirable.

It can be appreciated that the method 90 can be performed on local volumes in the earth formation in order to improve the accuracy of the mathematical relationship used to estimate the undetected microseismic events. In this adaptation, the earth formation may be divided into a plurality of grid cells, stages or event subsets in three-dimensional space. The term "grid cells" as used hereon can relate to the plurality of grid cells, stages, or event subsets. Using the location information derived from the seismic signals received by the array of seismic receivers, the detected events can be assigned to the corresponding grid cells. With the grid cells having assigned events and corresponding magnitudes, the method 90 is applied to the event data in each grid cell separately. By applying the method 90 to each grid cell separately, the mathematical relationship and associated constants and coefficients can be selected to fit the event data of the grid cell to more accurately predict the undetected events in that grid cell. When the method 90 is applied to all the grid cells in the plurality of grid cells, the calculated scalar attribute for each grid cell is estimated by summing all the scalar attributes for the events in each grid cell to provide a grid cell scalar attribute. Accordingly, summing all the grid cell scalar attributes for all grid cells provides an estimate the stimulated reservoir volume. Alternatively, the stimulated reservoir volume may be calculated summing all of the individual scalar attributes of all events throughout the reservoir.

Next, a methodology for the second step of correcting for microseismic spatial uncertainty for both detected and undetected events is discussed. Realizing that the microseismic location uncertainty is increasing with distance to the receiver array, one step is to identify a best subset microseismic data set. The best subset data is used to pick a baseline fracture geometry. For example, the two stages sketched out in FIGS. 3-5 show that the microseismic subset from stage "A" has better quality than those from stage "B". It has a smaller location error because the closer position to the monitoring array; and the microseismic event catalog is more complete for the same reason. Therefore the fracture geometry derived from stage "A" events is most likely more reasonable and representative of the existing formation microseismic events. So stage "A" fracture geometry is in this example being chosen as the baseline case. Other selection criteria may also be used such as a highest number of detected microseismic events, a highest number of detected microseismic events within a certain magnitude range, or a subset of microseismic events having a lowest magnitude of completeness.

Figure 13:
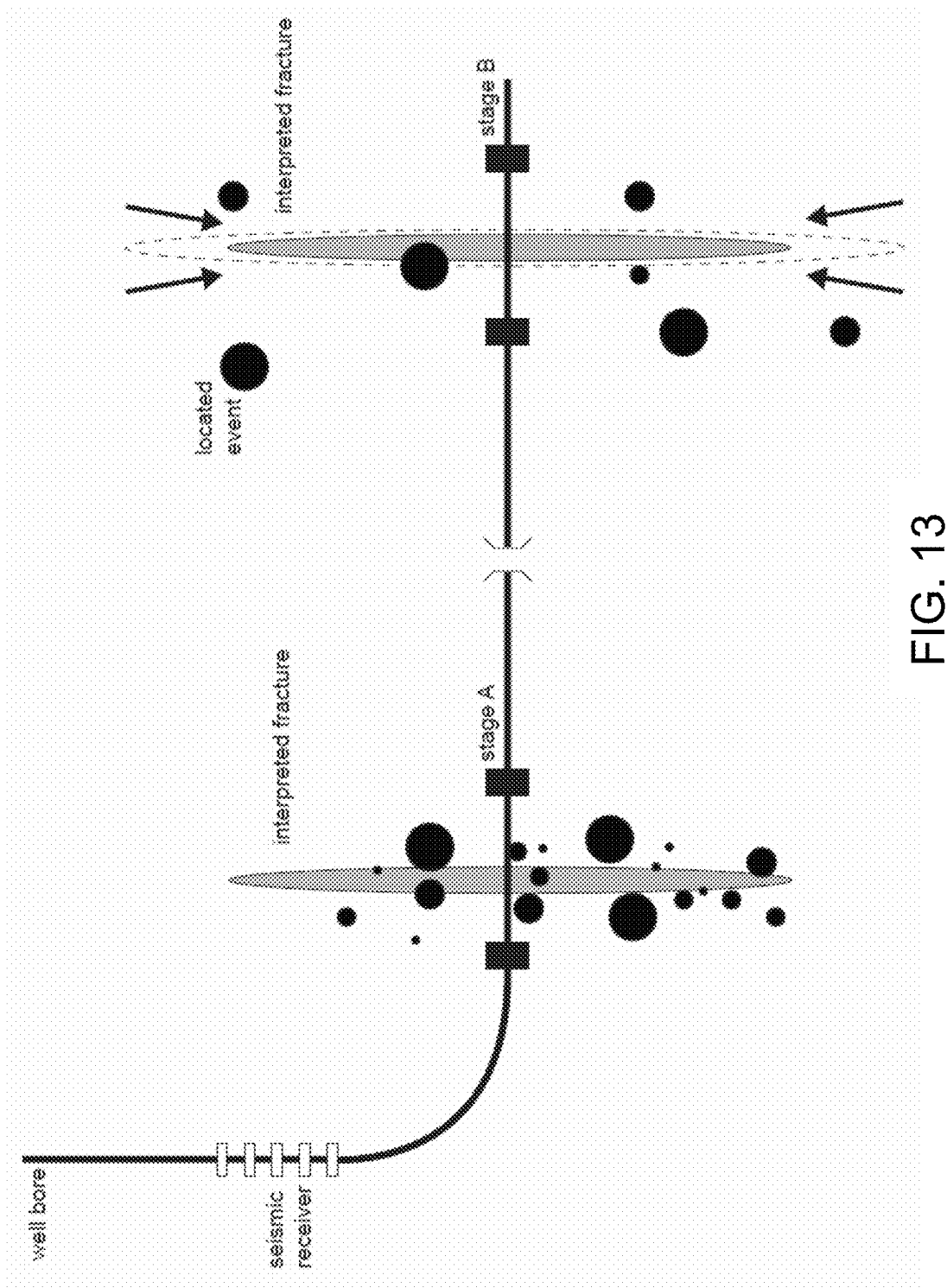
FIG. 13 depicts aspects of scaling fracture dimensions in a fracture model in the two stimulation stages example so that the dimensions are independent of a distance to the nearest receiver.

With this baseline fracture geometry selected, in another step, the fracture geometry derived from other microseismic subsets is scaled in respect to the baseline case. In one or more embodiments, the scaling factor is set proportional to those microseismic attributes which can be linked lineally to deformation (such as fracture size). This attribute has to be corrected for the detection range bias. As in the same two-stage example discussed above, the detection-range-bias correction needs to be applied to the stage "A" and "B" microseismic populations. This step allows accounting for the undetected population of the microseismic events, and translating the new population into a physical parameter that can be linked lineally to deformation, such as cumulative scalar moment ($\Sigma Mo$) or other attribute representative of the magnitude of the microseismic events. The ratio of these parameters is calculated and then used as a scaling factor to modify the deformation of one stage to be in line with the deformation of the baseline stage. Such as in FIG. 13, the ratio is used to scale the exaggerated interpreted fracture of stage "B" back to the baseline example dimensions. Based on the detected microseismic population of the stages, the theoretical population can be determined to form a measure which is independent of the distance to the nearest receiver. From the measure, the release of energy can be derived which is used to correct or scale the interpreted fracture accordingly. Large fractures which are drawn due to the larger spatial uncertainty of more distant events can then be scaled back to appropriate dimensions as determined by the baseline example.

Figure 14:
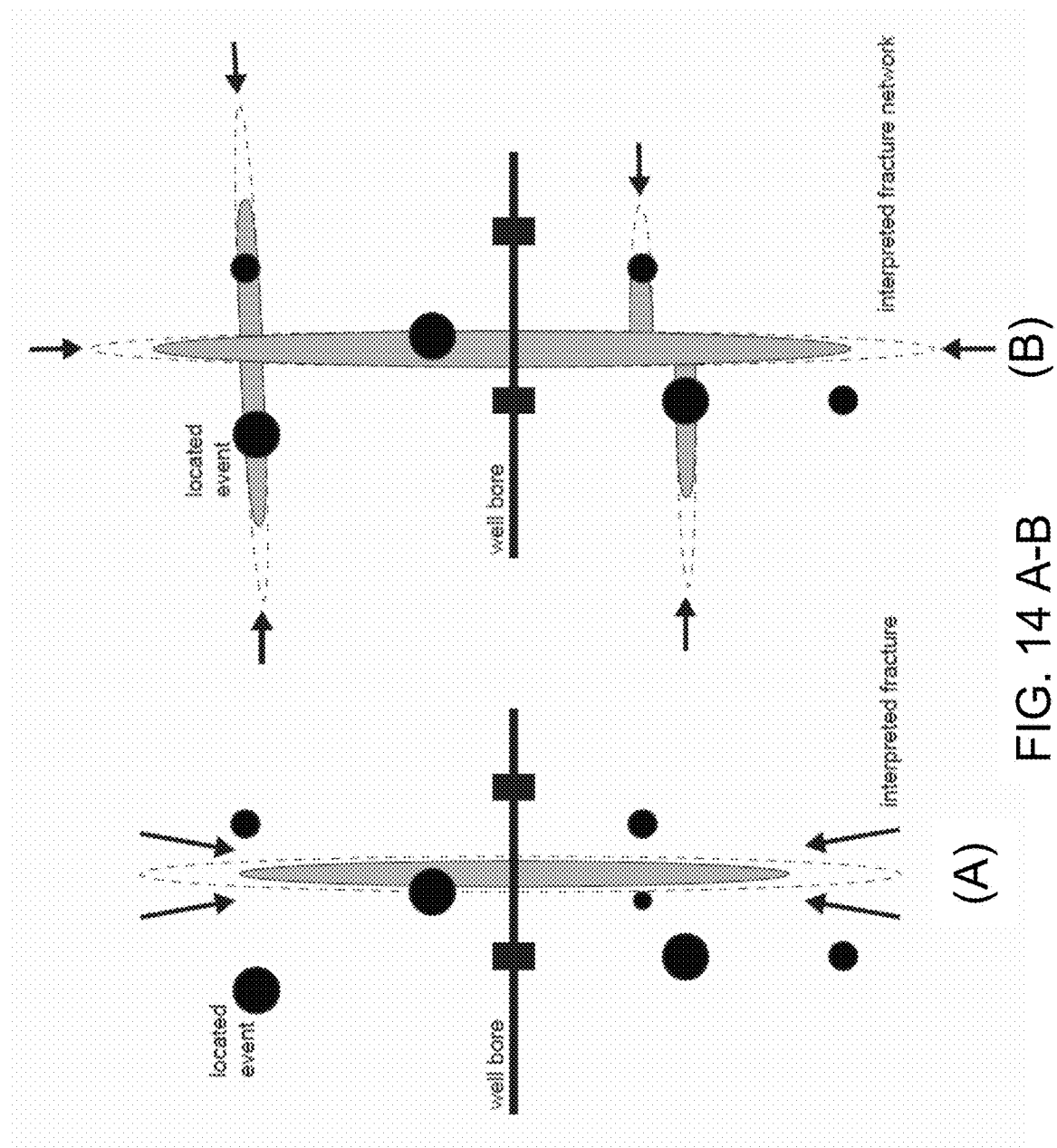
FIGS. 14A and 14B, collectively referred to as FIG. 14, depict aspects of scaling fracture dimensions within certain constraints in the fracture model in the two stimulation stages example.

FIG. 14 illustrates an example of applying the scaling correction. The scaling correction applied to the interpreted fracture can be applied in a number of ways and using a number of constraints. In case of a "bi-wing fracture" (FIG. 14A), the constraints are (1) symmetry in respect to the well bore, (2) central fit into the "seismic cloud", and (3) uniform scaling. For a more complex network (FIG. 14B) the constraints can be: (1) interconnected network to the well bore; and (2) scaling does not compromise connectivity while elongating/shortening fracture segments. In many cases, the location of the microseismic events cannot resolve the exact location and shape of the created bi-wing fracture of a fracture network for a number of reasons. For this, the user may be required to work with fracture models. Upon deciding on a most likely fracture model (e.g. bi-wing vs. stimulated network, bedding confined or not), the placement of the fracture can be based on the stimulated rock volume determination. Further constraints can be defined related to the selected fracture model. For a bi-wing fracture such as illustrated in FIG. 14, the user may force the fracture to be symmetric in respect to the well bore, with the same corrective scaling for both wings (see FIG. 14A). Other models may allow asymmetric bi-wings. When dealing with a fracture network, the scaling may be constrained in such a way, that the connectivity to the well bore is not compromised when fractures are extended or refracted (see FIG. 14B). Other constraints could be for example a limit on the fracture height by for example the bedding thickness. In the latter case the fracture length (and aperture) would be scaled, keeping the height constant. While a bi-wing fracture is depicted in FIG. 14, the scaling factor can be applied to other fracture geometries.

In summary, fracture or fracture network interpretations, which are based on microseismic event locations, are in many cases biased by the spatial uncertainty. Event populations associated with microseismic event subsets (e.g. per stage) that are more distant to the seismic receivers show less events and a larger spatial spread, for which the interpreter is tempted to interpret larger fractures or a larger stimulated network at these distant locations than exists in reality. Here, detection-range bias correction accounting is applied to account for undetected microseismic events. This is done in order to obtain the theoretical microseismic event population of the individual subsets. A scaling ratio can be established using parameters which can be lineally linked to deformation, such as the cumulative scalar moment. This scaling ratio can then be used to compare different subsets with each other and scale the fracture interpretations accordingly for each subset. Fracture size and extent can be scaled/extended/retracted based on the determined scaling factor and the chosen fracture model.

Next, one example of a method for correcting a fracture model of a reservoir is presented. The first step in the method calls for stimulating an earth reservoir using a stimulation apparatus configured to generate a plurality of seismic events in the reservoir. The second step calls for receiving a seismic signal having a magnitude from each seismic event in a plurality of seismic events that are in a plurality of stimulated stages in the reservoir to provide detected seismic event information in each of the stages, the seismic signal being received by an array of seismic receivers. The third step calls for selecting a stage in the plurality of stages as a reference stage according to a selection criterion. In general, the selection criterion selects a reference stage based on the selected stage having the highest level of confidence that the characteristics of that stage represent the characteristics of the other stages. The selection criterion may include selecting the stage that is closest to the array of seismic receivers and/or selecting the stage having the lowest magnitude of completeness. The fourth step calls for estimating a number of undetected seismic events and a magnitude for each of the undetected seismic events to provide undetected seismic event information for each stage in the plurality of stages, the number of undetected seismic events and corresponding magnitudes for each stage in the plurality of stages being estimated using each of the detected seismic events and corresponding magnitudes for the corresponding stage, wherein the detected seismic event information and the undetected seismic event information provide corrected seismic event information for each stage in the plurality of stages. The fifth step calls for determining a scalar property for each stage in the plurality of stages. On example of the scalar property is the cumulative scalar moment. The sixth step calls for calculating a scaling factor for each stage using the scalar property of the corresponding stage and the scalar property of the reference stage, the scaling factor relating the scalar property of the corresponding stage to the scalar property of the reference stage. In one or more embodiments, the scaling factor is a ratio of the scalar property of the corresponding stage to the scalar property of the reference stage. The seventh step calls for applying the scaling factor for each stage to the corrected seismic event information for the corresponding stage to provide scaled seismic event information for each stage in the plurality of stages. The scaled seismic event information for each stage may include a corrected fracture size, which may be represented by corrected fracture dimensions. The eighth step calls for correcting the fracture model with the scaled seismic event information for each stage in the plurality of stages to prove a corrected fracture model. This method may be implemented by an algorithm executed by a processor. The algorithm may be stored on a computer-readable medium for execution by the processor. This fracture model correcting method may also include estimating a stimulated reservoir volume using the corrected seismic event information for each of the stages in accordance with the disclosure above. It can be appreciated that this method may also be used to generate a fracture model when an existing fracture model is not available to be corrected.

It can be appreciated that the above disclosed method 90 may be implemented using the scaled seismic event information for each of the stages. The stages are thus used in lieu of grid cells. When implemented in this manner, the method 90 may include: determining a scalar attribute for each of the scaled seismic events for each stage; summing the scalar attributes for each of the scaled seismic events in each stage of events to provide a scaled stage scalar attribute; and summing all scaled stage scalar attributes to estimate the stimulated reservoir volume.

Figure 15:
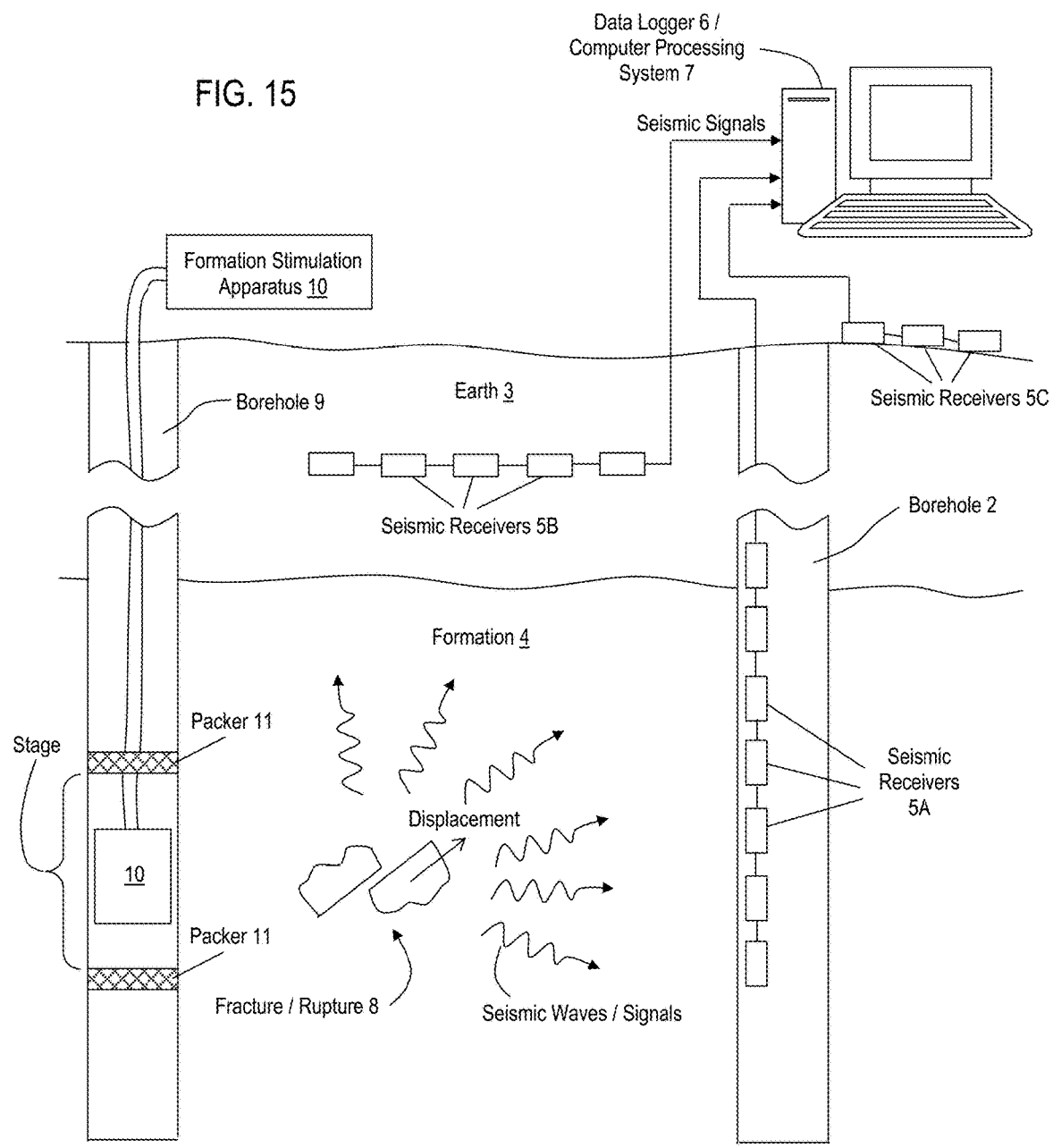
FIG. 15 illustrates a cross-sectional view of an embodiment of an earth formation instrumented to receive microseismic event data.

Next, apparatus for implementing the disclosed method is now discussed. FIG. 15 illustrates a cross-sectional view of an exemplary embodiment of a borehole 2 penetrating the earth 3 having a formation 4. A plurality of seismic transducers or receivers 5 is configured to receive seismic signals and convert them to electrical or optical signals for transmission and/or recording. In the art, seismic receivers may also be referred to as geophones. A plurality of seismic receivers 5A is disposed in the borehole 2. A plurality of seismic receivers 5B is buried shallow in the earth 3 while a plurality of seismic receivers 5C is disposed at the surface of the earth 3. The seismic receivers 5A, B and C are coupled to a data logger 6 that is configured to record a signal magnitude as a function of time for each of the seismic receivers. Functions of the data logger 6 may be performed by a computer processing system 7, which in addition to logging data may process seismic receiver data in accordance with the disclosure herein. It can be appreciated that a micro seismic monitoring network can include configurations and combinations of seismic receivers that may differ from the network of receivers illustrated in FIG. 15.

Still referring to FIG. 15, another borehole, a borehole 9, also penetrates the earth 3 and formation 4. A formation stimulus apparatus 10 is disposed in the borehole 9 and configured to stimulate rock in formation 4 such as by fracturing the rock or further opening existing fractures. Non-limiting embodiments of the formation stimulus apparatus are a hydraulic fracturing apparatus and a water injection apparatus. A section of the borehole 2 may be isolated by packers 11 above and below the stimulus apparatus 10 to form a stage in the formation that is stimulated. The formation 4 may thus be stimulated in a plurality of stages such as the stages illustrated in FIGS. 3 and 4.

A location of each or the seismic receivers 5A, B and C is known and together form an array of seismic receivers. When a rupture occurs (i.e. microseismic event) such as at 8 in FIG. 15, a seismic signal or wave is generated and travels in all directions through the formation 4 and/or earth 3 and is received by the array. Because the signal magnitude as a function of time is recorded at each seismic receiver, the signal shape and time of receipt of each signal relative to the other received signals are also known. From this information, metrics characterizing each microseismic event can be determined using known inversion techniques. Inversion relates to mathematical processing that can calculate the metrics of a cause for a resulting event that is measured. In case of the presence of three-directional-component receivers, the directional information of the signal can be derived as well. These techniques may be implemented by the computer processing system 7. In one example, the location of the rupture that would generate the received seismic signal is calculated using inversion techniques.

It can be appreciated that location and/or magnitude data (including scaled data) related to the plurality of detected microseismic events and undetected microseismic events may be plotted or represented "virtually" by a computer processing system without being actually plotted or displayed such as on paper or a computer display. Alternatively or in addition, the data may be plotted and displayed to a user using a printer or computer display. The plotted data may then be used to generate a corrected fracture model (see for example FIGS. 13 and 14) or correct an existing fracture model.

The above techniques provide several advantages. On advantage is that a more accurate estimate of fracture sizes is provided by employing the scaling factor. Another advantage is that the accuracy of estimates is improved by accounting for seismic events that are known to exist but are undetected due to low magnitude and/or distance to a seismic receiver. More accurate estimates of the number of fractures and their sizes can in turn improve the accuracy of the estimate of permeability, which can be used for well planning purposes.

In support of the teachings herein, various analysis components may be used, including a digital and/or an analog system. For example, the data logger 6, the computer processing system 7, the seismic receivers 5, or the stimulation apparatus 10 may include digital and/or analog systems. The system may have components such as a processor, storage media, memory, input interface, output interface, communications link (wired, wireless, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure. Processed data such as a result of an implemented method may be transmitted as a signal via a processor output interface to a signal receiving device. The signal receiving device may be a display monitor or printer for presenting the result to a user. Alternatively or in addition, the signal receiving device may be memory or a storage medium. It can be appreciated that storing the result in memory or the storage medium will transform the memory or storage medium into a new state (containing the result) from a prior state (not containing the result). Further, an alert signal may be transmitted from the processor to a user interface if the result exceeds a threshold value. Further, the result may be used as input into a controller (which may be implemented by the processing system 7) that provides a control signal in order to automatically control drilling equipment, well completion equipment or hydrocarbon extraction equipment so as to efficiently drill or extract hydrocarbons.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The term "configured" relates to one or more structural limitations of a device that enable the device to implement the operation or function for which the device is configured.

While one or more embodiments have been shown and described, modifications and substitutions may be made thereto without departing from the spirit and scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for correcting a fracture model of a reservoir, the method comprising:
   stimulating an earth reservoir in a plurality of stages using a stimulation apparatus configured to generate a plurality of seismic events in the reservoir;
   receiving a seismic signal having a magnitude from each seismic event in the plurality of seismic events that are in the plurality of stages in the reservoir to provide detected seismic event information in each of the stages, the seismic signal being received by an array of seismic receivers;
   selecting a stage in the plurality of stages as a reference stage according to a selection criterion;
   estimating a number of undetected seismic events and a magnitude for each of the undetected seismic events to provide undetected seismic event information for each stage in the plurality of stages, the number of undetected seismic events and corresponding magnitudes for each stage in the plurality of stages being estimated using each of the detected seismic events and corresponding magnitudes for the corresponding stage, wherein the detected seismic event information and the undetected seismic event information provide corrected seismic event information for each stage in the plurality of stages;
   determining a scalar property that is a measure of energy released by the seismic events for each stage in the plurality of stages, the scalar property being determined from the detected seismic event information provided by each received seismic signal for each stage;
   calculating a scaling factor for each stage using the scalar property of the corresponding stage and the scalar property of the reference stage, the scaling factor relating the scalar property of the corresponding stage to the scalar property of the reference stage, wherein the scaling factor comprises a ratio of the scalar property of the corresponding stage to the scalar property of the reference stage;
   applying the scaling factor for each stage to the corrected seismic event information for the corresponding stage to provide scaled seismic event information for each stage in the plurality of stages;
   correcting the fracture model with the scaled seismic event information for each stage in the plurality of stages to provide a corrected fracture model;
   calculating a stimulated reservoir volume using the corrected fracture model; and
   controlling at least one of drilling equipment, completion equipment, and hydrocarbon extraction equipment based on the stimulated reservoir volume using a controller;
   wherein the receiving, selecting, estimating, determining, calculating a scaling factor, applying, correcting, and calculating a stimulated reservoir volume are implemented by an algorithm executed by a processor.

2. The method according to claim 1, further comprising transmitting a signal comprising the corrected fracture model to a signal receiving device using an output interface.

3. The method according to claim 2, wherein the signal receiving device is a display or a printer and the method further comprises displaying the corrected fracture model to a user.

4. The method according to claim 2, wherein the signal receiving device is a storage medium or memory and the method further comprises storing the corrected fracture model.

5. The method according to claim 1, wherein the selection criterion comprises selecting the stage that is closest to the array of seismic receivers or the stage having the lowest magnitude of completeness.

6. The method according to claim 1, wherein the corrected seismic event information for each stage comprises a corrected fracture size or dimensions.

7. The method according to claim 6, further comprising applying a size constraint to the corrected fracture size.

8. The method according to claim 7, wherein the fracture is a bi-wing fracture and the size constraint forces the fracture to be symmetric with respect to the borehole.

9. The method according to claim 7, wherein the size constraint is such that reservoir connectivity to the borehole remains the same after application of the size constraint.

10. The method according to claim 7, wherein the size constraint is such that a fracture height is limited to a bedding thickness.

11. The method according to claim 1, further comprising estimating a stimulated reservoir volume using the scaled seismic event information for each of the stages.

12. The method according to claim 11, wherein applying comprises applying the scaling factor to each of the detected and undetected seismic events to provide scaled seismic events for each stage.

13. The method according to claim 12, further comprising determining a scalar attribute for each of the scaled seismic events for each stage.

14. The method according to claim 13, further comprising summing the scalar attributes for each of the scaled seismic events in each stage of events to provide a scaled stage scalar attribute.

15. The method according to claim 14, further comprising summing all stage scaled scalar attributes to estimate the stimulated reservoir volume.

16. The method according to claim 1, wherein the scaled seismic event information comprises a scalar attribute for each of the detected and undetected seismic events for each stage.

17. A method for generating a fracture model of a reservoir, the method comprising:
receiving a seismic signal having a magnitude from each seismic event in a plurality of seismic events that are in a plurality of stimulated stages in the reservoir to provide detected seismic event information in each of the stages, the seismic signal being received by an array of seismic receivers;
selecting a stage in the plurality of stages as a reference stage according to a selection criterion;
estimating a number of undetected seismic events and a magnitude for each of the undetected seismic events to provide undetected seismic event information for each stage in the plurality of stages, the number of undetected seismic events and corresponding magnitudes for each stage in the plurality of stages being estimated using each of the detected seismic events and corresponding magnitudes for the corresponding stage, wherein the detected seismic event information and the undetected seismic event information provide corrected seismic event information for each stage in the plurality of stages;
determining a scalar property that is a measure of energy released by the seismic events for each stage in the plurality of stages, the scalar property being determined from the detected seismic event information provided by each received seismic signal for each stage;
calculating a scaling factor for each stage using the scalar property of the corresponding stage and the scalar property of the reference stage, the scaling factor relating the scalar property of the corresponding stage to the scalar property of the reference stage, wherein the scaling factor comprises a ratio of the scalar property of the corresponding stage to the scalar property of the reference stage;
applying the scaling factor for each stage to the corrected seismic event information for the corresponding stage to provide scaled seismic event information for each stage in the plurality of stages;
generating the fracture model with the scaled seismic event information for each stage in the plurality of stages to provide a corrected fracture model; and
calculating a change a stimulated reservoir volume using the corrected fracture model;
transmitting, using an output interface, a signal comprising the stimulated reservoir volume to a controller; and
controlling at least one of drilling equipment, completion equipment, and hydrocarbon extraction equipment based on the stimulated reservoir volume using the controller;
wherein the receiving, selecting, estimating, determining, calculating a scaling factor, applying, correcting, and calculating a stimulated reservoir volume are implemented by an algorithm executed by a processor.

18. A non-transitory computer readable medium comprising computer executable instructions for correcting a fracture model of a reservoir that when executed by a computer causes apparatus to implement a method comprising:
receiving a seismic signal having a magnitude from each seismic event in a plurality of seismic events that are in a plurality of stimulated stages in the reservoir to provide detected seismic event information in each of the stages, the seismic signal being received by an array of seismic receivers;
selecting a stage in the plurality of stages as a reference stage according to a selection criterion;
estimating a number of undetected seismic events and a magnitude for each of the undetected seismic events to provide undetected seismic event information for each stage in the plurality of stages, the number of undetected seismic events and corresponding magnitudes for each stage in the plurality of stages being estimated using each of the detected seismic events and corresponding magnitudes for the corresponding stage, wherein the detected seismic event information and the undetected seismic event information provide corrected seismic event information for each stage in the plurality of stages;
determining a scalar property that is a measure of energy released by the seismic events for each stage in the plurality of stages, the scalar property being determined from the detected seismic event information provided by each received seismic signal for each stage;
calculating a scaling factor for each stage using the scalar property of the corresponding stage and the scalar property of the reference stage, the scaling factor relating the scalar property of the corresponding stage to the scalar property of the reference stage, wherein the scaling factor comprises a ratio of the scalar property of the corresponding stage to the scalar property of the reference stage;

applying the scaling factor for each stage to the corrected seismic event information for the corresponding stage to provide scaled seismic event information for each stage in the plurality of stages;

correcting the fracture model with the scaled seismic event information for each stage in the plurality of stages to provide a corrected fracture model;

calculating a stimulated reservoir volume using the corrected fracture model;

transmitting, using an output interface, a signal comprising the corrected fracture model to a controller; and controlling at least one of drilling equipment, completion equipment, and hydrocarbon extraction equipment based on the stimulated reservoir volume using the controller.

* * * * *